(12) United States Patent  (10) Patent No.: US 7,719,769 B2
Sugihara et al.  (45) Date of Patent: May 18, 2010

(54) HEAD MOUNT TYPE IMAGE DISPLAY SYSTEM

(75) Inventors: Ryohei Sugihara, Hachioji (JP); Yoichi Iba, Hachioji (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 11/600,429

(22) Filed: Nov. 16, 2006

(65) Prior Publication Data

US 2007/0058261 A1 Mar. 15, 2007

Related U.S. Application Data

(63) Continuation-in-part of application No. PCT/JP2005/003245, filed on Feb. 22, 2005.

(30) Foreign Application Priority Data

May 17, 2004 (JP) ............................ 2004/145838

(51) Int. Cl.
G02B 27/14 (2006.01)
G09G 5/00 (2006.01)
(52) U.S. Cl. .......................................... 359/630; 345/8
(58) Field of Classification Search ......... 359/630–634; 345/7–9
See application file for complete search history.

(56) References Cited

U.S. PATENT DOCUMENTS

| | | | |
|---|---|---|---|
| 3,923,370 A | 12/1975 | Mostrom | |
| 5,646,784 A | 7/1997 | Wilson | |
| 6,023,372 A | 2/2000 | Spitzer et al. | |
| 6,353,503 B1 | 3/2002 | Spitzer et al. | |

(Continued)

FOREIGN PATENT DOCUMENTS

JP 63-318503 A 12/1988

(Continued)

OTHER PUBLICATIONS

Melzer, James E. and Moffitt, Kirk, "Head Mounted Displays: Designing for the User", pp. 88-93, ISBN 0-07-041819-85, published by McGraw-Hill, 1996.

*Primary Examiner*—Alicia M Harrington
(74) *Attorney, Agent, or Firm*—Frishauf, Holtz, Goodman & Chick, P.C.

(57) ABSTRACT

It is an object of the invention to provide a head mount type image display system that, albeit having a see-around and a see-through function, is small size and low weight, makes sure a large field of outside view and low power consumption with high-luminance electronic images, and is easy to use.

A head mount type image display system 1 at least comprises a display device, an eyepiece optical system, an eyepiece window, an eyepiece window holder 2, a casing and a supporter 10 for fixing all these components onto a user's head. The casing covers the display device, the eyepiece window holder 2 holds the eyepiece window within a user's field of view, the eyepiece optical system forms a virtual image of an image displayed on the display device, the eyepiece window allows a light beam for forming the virtual image to be directed to a user's eye and leave it, and a member that forms the eyepiece window holder is such that, in a range of 10 mm or greater from the eyepiece window toward a base, a width of projection section in a user's visual axis direction is 4 mm or less except some projection, and has a see-around mechanism.

28 Claims, 22 Drawing Sheets

U.S. PATENT DOCUMENTS

| | | | |
|---|---|---|---|
| 6,747,611 B1 * | 6/2004 | Budd et al. | 345/7 |
| 7,158,096 B1 * | 1/2007 | Spitzer | 345/8 |
| 2001/0033440 A1 * | 10/2001 | Togino | 359/631 |
| 2002/0135830 A1 * | 9/2002 | Endo et al. | 359/630 |
| 2007/0247730 A1 | 10/2007 | Yamazaki et al. | |

FOREIGN PATENT DOCUMENTS

| | | |
|---|---|---|
| JP | 01-179902 A | 7/1989 |
| JP | 07-046513 A | 2/1995 |
| JP | 08-166557 A | 6/1996 |
| JP | 08-313829 A | 11/1996 |
| JP | 10-170841 A | 6/1998 |
| JP | 10-301055 A | 11/1998 |
| JP | 11-249067 A | 9/1999 |
| JP | 2000-196975 A | 7/2000 |
| JP | 2000-511306 A | 8/2000 |
| JP | 2001-021831 A | 1/2001 |
| JP | 2001-522064 A | 11/2001 |
| JP | 2002-162598 A | 6/2002 |
| JP | 2003-502713 A | 1/2003 |
| JP | 2003-502714 A | 1/2003 |
| JP | 2003-522974 A | 7/2003 |
| WO | WO 98/15868 A1 | 4/1998 |
| WO | WO 99/23525 A1 | 5/1999 |
| WO | WO 00/79330 A1 | 12/2000 |
| WO | WO 01/59507 A1 | 8/2001 |

* cited by examiner

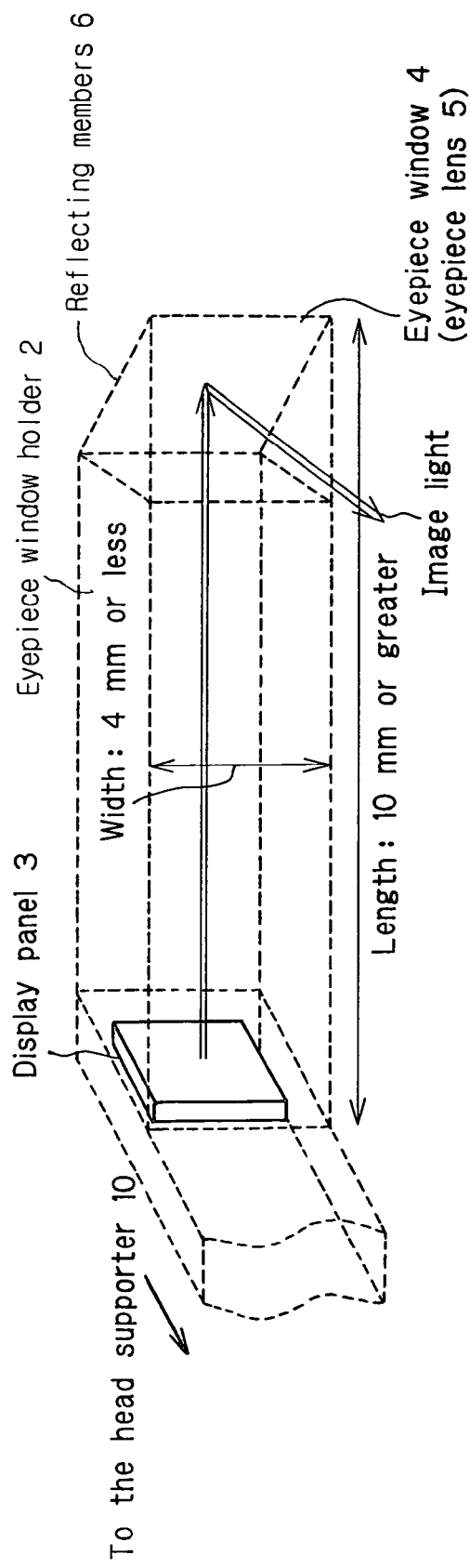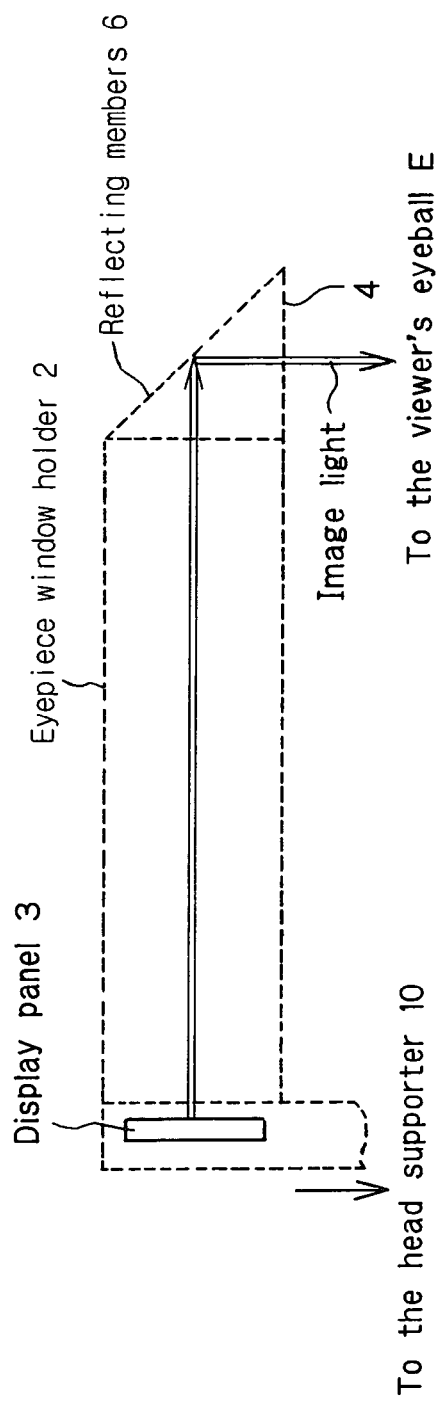
FIG. 4(a)
FIG. 4(b)

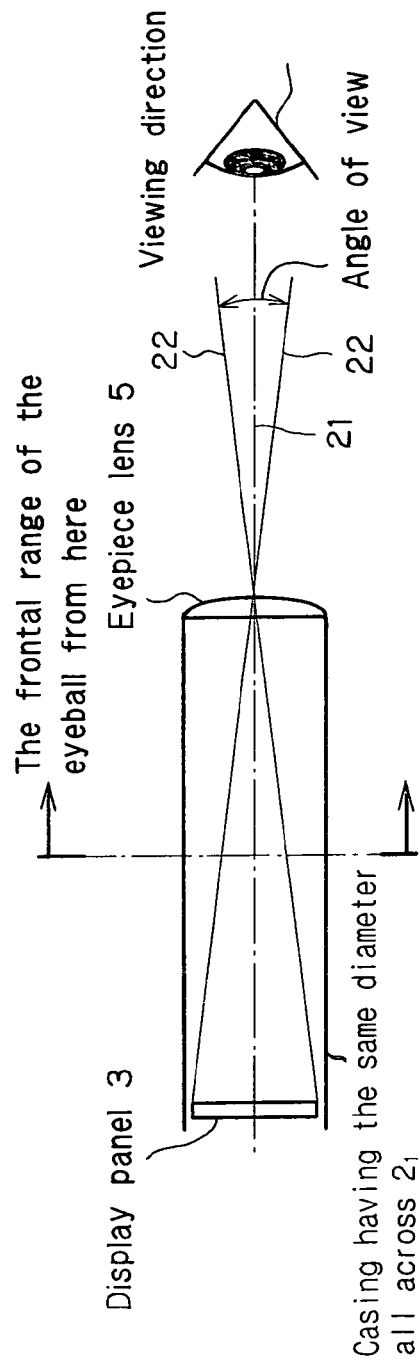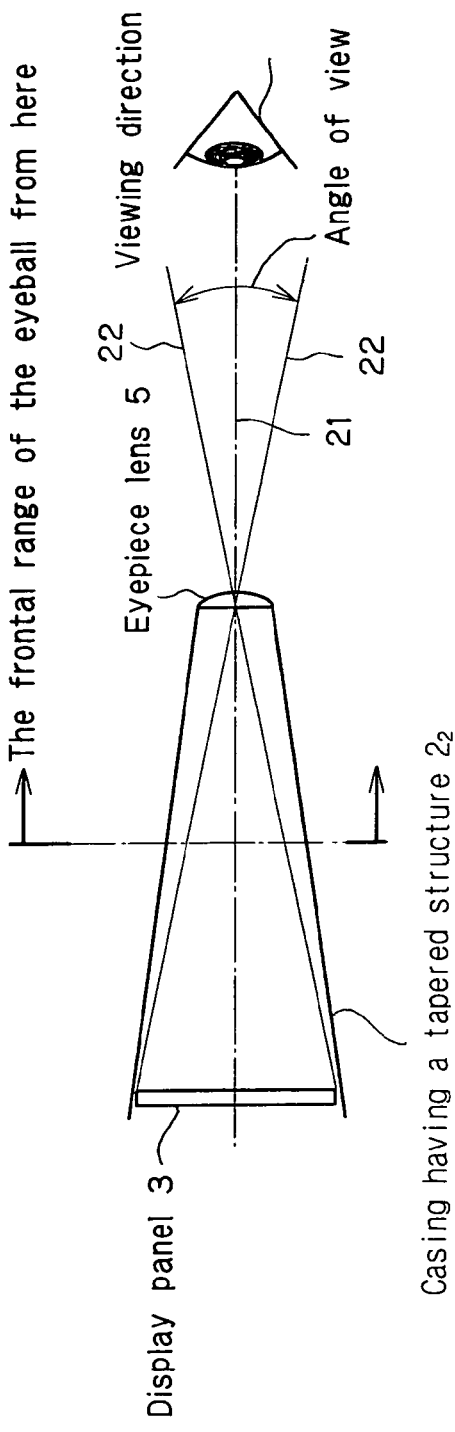
FIG. 9(a)
FIG. 9(b)

The horizontal size of the eye point

The horizontal size of the eye point

HEAD MOUNT TYPE IMAGE DISPLAY SYSTEM

This application is a Continuation-In-Part of International Application No. PCT/JP2005/003245 filed Feb. 22, 2005, the entire contents of which are incorporated herein by reference.

TECHNICAL ART

The present invention relates generally to a head mount type image display system, and more particularly to a head mount type image display system that is user-friendly in environments of mobile use.

BACKGROUND ART

A head mount type image display system is roughly broken down into two usage patterns: one where the user watches fixedly (without moving the body largely) at only electronic images displayed by the head mount type image display system while the field of outside view is cut off as much as possible, and another where the head mount type image display system is used for the purposes of checking the necessary information upon working operation, checking emergent information out of doors, etc.; the user views electronic images while, at the same time, the field of outside view is ensured as much as possible. And then, the head mount type image display system that is going to be used according to the latter usage pattern has a mechanism called a see-around or see-through mechanism for the purpose of making sure the field of outside view. The present invention is concerned with a head mount type image display system that is going to be used according to the latter usage pattern and so has the see-around or see-through mechanism.

The see-around mechanism is to enable the user to view outside images around an electronic image significantly in an unobstructed way, even when the head mount type image display system remains mounted on the user's head. Typical prior arts are Patent Publications 1, 2 and 3.

On the other hand, the see-through mechanism is to make it possible for the user to view outside images while they overlap electronic images displayed by the head mount type image display system. Typical prior arts are Patent Publications 4, 5 and 6.

[Patent Publication 1] JP(A)8-166557
[Patent Publication 2] JP Domestic Publication No. 2003-502713
[Patent Publication 3] U.S. Pat. No. 3,923,370
[Patent Publication 4] U.S. Pat. No. 5,646,784
[Patent Publication 5] 2000-196975
[Patent Publication 6] JP(A)10-301055
[Patent Publication 7] JP(A)8-313829
[Patent Publication 8] JP(A)11-249067

DISCLOSURE OF THE INVENTION

Problems to be Achieved by the Invention

Clearly in the latter usage pattern of the above two usage patterns for the head mount type image display system, there are still growing demands for the head mount type image display system:

"small size and low weight that do not cause much trouble when the user moves about", "the field of outside view that makes sure such a clear, wide field that does not cause much trouble when the user works or moves about", and "an electronic image that has a luminance high enough to be comparable to the brightness of the outside".

As described just below, however, all prior head mount type image display systems having the see-around or see-through mechanism could not satisfy those requirements at the same time.

With technical means for setting a long distance (hereinafter called the working distance) between the user's eye and a head mount type image display system so that the field of outside view is ensured with a gap between them, as set forth typically in Patent Publication 1 having the see-around mechanism, there was a large working distance needed for the purpose of making sure a wide field of outside view. Further, according to the prior art, typically Patent Publication 7, the exit pupil of the head mount type image display system is positioned near the pupil of the eyeball of the user or its center of rotation; as the working distance increases, it causes the aperture of the eyepiece window of the head mount type image display system to increase proportionally, with the result that any small-size, low weight head mount type image display system is not achievable, and the field of outside view is largely cut off. Another problem with the prior art is that the wearer looks as if the face were fully covered; the natural expressions of the wearer do not come through.

Regarding the see-through mechanism, Patent Publication 8 shows that a half-silvered mirror for an optical element (generally called the combiner) is used to overlap the field of outside view with electronic images. With the type that uses a half-silvered mirror for the combiner, both extraneous light and electronic image light decrease. Thus, a head mount type image display system that incorporates this type of combiner, because of being poor in the efficiency of utilization of both extraneous light and electronic image light, have problems in that there are a luminance too worse to obtain high-luminance images, increased power consumptions, etc.

On the other hand, Patent Publication 4 shows that an HOE (holographic optical element) reflective to only a specific wavelength and transmissive to other light is used for the combiner, so that the efficiency of utilization of both extraneous light and electronic image light can be enhanced. However, there are problems still left behind in that electronic images become monochrome, when the outside is viewed through the HOE, there is unnatural coloration, etc.

Patent Publication 3 shows that a portion of the half-silvered mirror functioning as a combiner is supported by a transparent member in the air so that the user can view the outside through that transparent portion, thereby achieving not only the see-through mechanism but also the see-around mechanism. To make sure a wide field of outside view, however, it is necessary to make that transparent portion large, resulting in a very bulky head mount type image display system.

Patent Publication 2 shows that an optical element located just before the eyeball is configured as a columnar transparent member, thereby achieving a see-around mechanism that makes sure a wide field of outside view albeit being of small size. However, because a part of the field of outside view is viewed through that columnar transparent member, there is inconvenience that stray light that renders an image substantially hard to see is likely to occur by unnecessary reflected light. That is, as shown in FIG. 27, for instance when a mountain far in the horizontal direction is viewed, light rays from the sun above are incident on the columnar transparent support member 100, whereupon the internally reflected light will be seen as unnecessary light 101. This leads to a problem that an unpleasant image will be seen upon seeing-around.

In view of such problems with the prior art, it is an object of the invention to provide a head mount type image display system that, albeit having a see-around and a see-through mechanism, is small size and low weight, makes sure a large field of outside view and low power consumption with high-luminance electronic images, and is easy to use.

According to the invention, the above object is achieved by the provision of a head mount type image display system at least comprising a display device, an eyepiece optical system, an eyepiece window, an eyepiece window holder, a casing and a supporter for fixing all these components onto a user's head, characterized in that a light source illuminates said display device, said casing covers said display device, said eyepiece window holder holds said eyepiece window within a user's field of view, said eyepiece optical system forms a virtual image of an image displayed on said display device, said eyepiece window is a window through which a light beam to form said virtual image leaves toward a user's eye, and a member that forms said eyepiece window holder is configured as a see-around type having a length of 10 mm or greater, wherein a width of projection section in a user's visual axis direction is 4 mm or less except some projection.

It is then preferable to satisfy D/f<0.5 where D is the diagonal size of an effective display surface of the display device, and f is the focal length of the eyepiece optical system.

The light source adapted to illuminate the display device could be formed of a fluorescent resin rod.

Advantages of the Invention

In the invention, the member that forms the eyepiece window holder is constructed such that its width of projection section in the user's visual axis is set to 4 mm or less, and that it is thinner than a human average pupil diameter (4 mm). Thus, even with the system located in the field of view, the see-through effect is achievable because the outside is not fully cut off. In addition, because of no use of any half-silvered mirror leading to light quantity losses, it is possible to view bright electronic images. Further, a site with electronic images displayed becomes dim enough to improve on the visibility of electronic images, because some light beams from the outside are blocked off by the member that forms the eyepiece window. Still further, except the site with electronic images displayed, the field of outside view is not cut off at all, so that a clear-cut, bright field of view is achievable as if the system of the invention were not present. Furthermore, because the system of the invention is thinner than the pupil diameter so that the wearer's eyes are not fully covered, the wearer's more natural expressions would come through.

Best Mode for Carrying Out the Invention

First of all, how the head mount type image display system of the invention is embodied will be described, and then examples will be given.

The first embodiment of the invention is directed to a head mount type image display system at least comprising a display device, an eyepiece optical system, an eyepiece window, an eyepiece window holder, a casing and a support for fixing all these parts onto a user's head, wherein said casing covers said display device, said eyepiece window holder holds said eyepiece window within a user's field of view, said eyepiece optical system form a virtual image of an image displayed on said display device, said eyepiece window allows a light beam for forming said virtual image to be directed to a user's eye and leave it, and a member that forms said eyepiece window holder is such that, in a range of 10 mm or greater from said eyepiece window toward a base, a width of projection section in a visual axis direction of a user is 4 mm or less except some projection, and has a see-around mechanism.

In this case, as shown in FIG. 1, the eyepiece window holder 2 that is a sort of shield matter positioned in front of the eyeball E is constructed in such a way as to have a length of 10 mm or greater and be thinner than the human being's average pupil diameter of 4 mm; as shown in FIG. 6, light beams from the outside are not completely cut off, so that an outside image on the side of the eyepiece window holder 2 that faces away from the eyeball E is visible as if it were seen through the eyepiece window holder 2. Because extraneous light is unlikely to pass through the interior of the eyepiece window holder 2, it is possible to eliminate unnecessary reflection that is a problem with the prior art. That is, there is the see-around effect obtainable, which has the features of:

"low weight and small size",

"no ghost", and

"large field of outside view".

According to the second embodiment of the invention, the head mount type image display system as recited in the first embodiment is further characterized in that the member that forms the eyepiece window is constructed such that the width of projection section in the user's visual axis direction is 4 mm or less, and has a see-through function.

Again in this case, the member that forms the eyepiece window is kept smaller than the human being's average pupil diameter of 4 mm; as shown in FIG. 6, an outside image away from the member that forms the eyepiece window can be visible as if it were seen through that member. The light beams of an electronic image leave from the eyepiece window, so that the outside image and electronic image are visible in an overlapping way. That is, there is the see-through effect obtainable. In addition, while neither a half-silvered mirror nor an HOE is used, the see-through effect is achievable. Nonetheless, the additional features of:

"no light quantity losses in electronic images", and

"electronic images can be displayed in colors" are obtainable.

Further, the site with electronic images displayed becomes dim enough to improve on the visibility of electronic images, because some light beams from the outside are blocked off by the member that forms the eyepiece window. Accordingly, the brighter the outside, the more the user's pupil is constricted and, hence, the more the quantity of the light blocked becomes, resulting in an enhanced action on the maintenance of visibility.

According to the third embodiment of the invention, the head mount type image display system according to the first embodiment is further characterized in that between said eyepiece window holder and said eyepiece window, there is a total reflection mirror or prism located, which is adapted to bend an optical axis in the user's eye direction.

In this case, if an optical path created parallel with the face is bent by the total reflection mirror or prism into the user's eye, it is then possible to reduce the amount of the head mount type image display system that protrudes out of the face.

According to the fourth embodiment of the invention, the head mount type image display system according to any one of the first to the third embodiment is further characterized in that said eyepiece window holder is held in such a way as to be substantially horizontally located upon mounted onto the head.

As the casing is located in such a way as to cover the face, it would seem unpleasant to a third person. With this arrangement, however, it is possible to avoid that.

According to the fifth embodiment of the invention, the head mount type image display system according to the third embodiment is further characterized in that the whole of said eyepiece window and said total reflection mirror or the whole of said eyepiece window and said total reflection prism has a rotation mechanism, by which their rotation can be adjusted with the longitudinal direction of said eyepiece window holder as a rotation axis.

When the mount position of the head mount type image display system is vertically displaced or when the optical path for an electronic image is vertically misaligned with respect to the user's eyeball due to the person-to-person difference in the user's head shape, such displacement or misalignment is corrected by adjustment of rotation by such a rotation mechanism as described above, so that the optical path for an electronic image can be guided into the user's eye.

According to the sixth embodiment of the invention, the head mount type image display system according to the third embodiment is further characterized by comprising a rotation mechanism, by which the user can adjust the rotation of said display device with the direction vertical to the display surface of said display device as a rotation axis.

As the rotation of the display device is adjusted according to the fifth embodiment, it causes an image viewed through the head mount type image display system to have a tilt in the horizontal direction. In this case, if the display device is adjusted by rotation with the direction vertical to the display surface of the display device as the rotation axis, it is then possible to erect that image.

According to the seventh embodiment of the invention, the head mount type image display system according to any one of the $1^{st}$ to the $6^{th}$ embodiment is further characterized in that a part or the whole of said eyepiece optical system is integral with said eyepiece window.

Thus, if a part or the whole of the eyepiece optical system is integral with the eyepiece window, an optical element count can be decreased with a lot more simplified structure, so that the width of the member that forms the eyepiece window can be easily set to 4 mm or less.

According to the eighth embodiment of the invention, the head mount type image display system according to any one of the $1^{st}$ to the $7^{th}$ embodiment is further characterized in that a part or the whole of said eyepiece optical system is built in said eyepiece window holder.

Thus, if the eyepiece optical system is built in the eyepiece window supporter, it is then possible to dispense with any special space for storing the eyepiece optical system, thereby slimming down the head mount type image display system.

According to the ninth embodiment of the invention, the head mount type image display system according to the $8^{th}$ embodiment is further characterized in that said eyepiece optical system built in said eyepiece window holder is an optical system that has an action of converging a parallel light beam.

When the light beams of an electronic image are passed through the interior of the eyepiece window supporter, the diffusion of the necessary light beam can be held back if the optical system having an action of converging a light beam is built in there, whereby the light beam can be passed through while its diameter is decreased. Thus, the member that forms the eyepiece window supporter can be easily designed to have a width of 4 mm or less.

According to the tenth embodiment of the invention, the head mount type image display system according to any one of the $1^{st}$ to the $9^{th}$ embodiment is further characterized in that said eyepiece window has a rectangular shape whose long side is in the same direction as the longitudinal direction of said eyepiece window holder.

By making the eyepiece window vertically short (in the width direction of the eyepiece window holder), the whole of the eyepiece optical system portion can be slimmed down, and by making it horizontally long (in the longitudinal direction of the eyepiece window holder), a wide eye point is ensured for easy position adjustment. In addition, an increase in the quantity of light brought in from the eyepiece window enables bright images to be viewed.

According to the $11^{th}$ embodiment of the invention, the head mount type image display system according to any one of the $1^{st}$ to the $9^{th}$ embodiment is further characterized in that said eyepiece window has an aperture size that is smaller than the pupil diameter in the vertical direction and larger than the pupil diameter in the horizontal direction.

In addition to the advantage of the head mount type image display system according to the $10^{th}$ embodiment of the invention, the see-through effect is further obtainable by making that aperture size smaller than the pupil diameter in the vertical direction.

According to the $12^{th}$ embodiment of the invention, the head mount type image display system according to any one of the $1^{st}$ to the $9^{th}$ embodiment is further characterized in that said eyepiece window has an aperture size that is 4 mm or less in the vertical direction and 4 mm or greater in the horizontal direction.

Assuming that the human being's average pupil diameter is 4 mm as noted above, it is desired that the aperture size of the eyepiece window be 4 mm or less in the vertical direction and 4 mm or greater in the horizontal direction. This ensures that the advantages of the head mount type image display systems according to the $10^{th}$ and the $11^{th}$ embodiment are easily achievable.

According to the $13^{th}$ embodiment of the invention, the head mount type image display system according to any one of the $1^{st}$ to the $9^{th}$ embodiment is further characterized in that said casing and said eyepiece window holder are joined together by way of a total reflection mirror or prism, or an image fiber bundle.

Thus, as the casing adapted to cover the display device and the eyepiece window holder are joined together by way of a total reflection mirror or prism, or an image fiber bundle, it enables the casing to be mounted on the user's temple side. When the head mount type image display system is not in use, it can be bent along that portion into a compact form for easy storage or carrying.

According to the $14^{th}$ embodiment of the invention, the head mount type image display system according to any one of the $1^{st}$ to the $13^{th}$ embodiment is further characterized in that there is an illumination portion, and said illumination portion and said casing are joined together by way of a total reflection mirror or prism, a light guide sheet, or a light guide.

In this case, the casing can be located on the user's temple side. When the head mount type image display system is not in use, it can be bent along that portion into a compact form for easy storage or carrying.

According to the $15^{th}$ embodiment of the invention, the head mount type image display system according to the $9^{th}$ embodiment is further characterized in that said eyepiece optical system comprises a convex lens.

In this case, the positive power of the convex lens is going to form a virtual image of the display device that the viewer can view.

According to the $16^{th}$ embodiment of the invention, the head mount type image display system according to the $8^{th}$ and the 9th embodiment is further characterized in that said eyepiece optical system comprises an optical medium whose refractive index grows gradually high in a radial direction.

As the optical medium whose refractive index grows gradually high in the radial direction is used for the eyepiece optical system, it makes it easy to design the member that forms the eyepiece window supporter in the form of a thinner arrangement of 4 mm or less, because that optical medium has an action of converging a light beam.

According to the 17th embodiment of the invention, the head mount type image display system according to the 1st to the 16th embodiment is further characterized by satisfying D/f<0.5, where D is the diagonal size of an effective display surface of the display device, and f is the focal length of the eyepiece optical system.

FIG. 14 is illustrative of relations among various parameters of the display system according to the invention. Paraxial optics theory teaches that when the diagonal size (effective diameter) of an effective display surface of the display system is represented by D, a half angle of an electronic image field of view by $\omega/2$, and the focal length of the eyepiece optical system by f, there are the following relations:

$$\omega/2=(D/2)/f \quad (1)$$

When the maximum angle of inclination of a chief ray at which the chief ray can pass through the user's pupil is represented by $\xi$, the user's pupil diameter by d, and the working distance by W, there are the following relations:

$$\xi=(d/2)/W \quad (2)$$

The condition for ensuring that an image is clearly seen as far as its periphery is $$\omega/2<\xi \quad (3)$$

Then, $$D/f<d/W \quad (4)$$

Here, the user's pupil diameter d is at most about 5 mm, and with interferences by eyelashes at the time of blinking, etc. in mind, the working distance W to be taken is about 10 mm. Then, the substitution of d=5 mm and W=10 mm for inequality (4) gives $$D/f<0.5 \quad (5)$$

Here, if the exit pupil of the display system is positioned near the eyepiece window or between the eyepiece window and the pupil of the user's eye, it is then possible to reduce the shading of light beams at the periphery of the image under observation. Even so, as D/f exceeds 0.5, it causes shading to take place.

Thus, it is preferable for the optical system in the display system of the invention to satisfy the condition D/f<0.5, because it is then possible to achieve a display system that, albeit being a small-format system, enables electronic images to be viewed without shading.

According to the 18th embodiment of the invention, the head mount type image display system according to the 17th embodiment is further characterized in that the exit pupil is positioned near the eyepiece window or between the eyepiece window and the pupil of the user's eye.

As noted above, by satisfying D/f<0.5 and positioning the exit pupil near the eyepiece window or between the eyepiece window and the pupil of the user's eye, it is then possible to view electronic images devoid of shading.

According to the 19th embodiment of the invention, the head mount type image display system according to the 1st embodiment is further characterized in that an electronic image-formation light beam leaving the display device passes outside of the eyepiece window holder.

When the electronic image-formation light beam passes through the interior of the eyepiece window holder, the member that forms the eyepiece window supporter cannot be thinner than the thickness of the diameter of that light beam. However, if the electronic image-formation light beam is permitted to pass outside of the eyepiece window holder, it is then possible to design the ideal see-around arrangement, because the member that forms the eyepiece window supporter is free from such limitation.

According to the 20th embodiment of the invention, the head mount type image display system according to the 1st embodiment is further characterized by comprising an illuminating light source adapted to illuminate the display device, wherein said light source is made up of a fluorescent resin rod.

A fluorescent resin rod emits light through self-luminescence upon irradiation with extraneous light, and the emitted light is subjected to total reflection within the rod, leaving its end face. By utilizing this as an illuminating light source adapted to illuminate the display device, it is possible to cut back the power consumption of the head mount type image display system. Further, as the outside grows bright, it causes the luminance of the light source to grow high, thereby avoiding an inconvenience that an electronic image becomes hard to be visible because it is outdone by the brightness of the outside.

According to the 21st embodiment of the invention, the head mount type image display system according to the 20th embodiment is further characterized in that the end face of the fluorescent resin rod that faces away from the display device is mirror coated or configured into a corner cube shape.

Thus, if the opposite end face of the fluorescent resin rod is mirror coated or configured into a corner cube shape, it is then possible to reflect light that otherwise will go out in the opposite direction and reuse that light as illuminating light for the display device.

According to the 22nd embodiment of the invention, the head mount type image display system according to the 20th embodiment is further characterized in that there is a mirror located on the side of said fluorescent resin rod, on which no extraneous light is incident.

Thus, by locating a mirror on the side that is not the incident side, light that is incident from the side of the fluorescent resin rod and transmits the fluorescent resin rod without striking upon the fluorescent material is reentered in the fluorescent resin rod, thereby increasing the efficiency of utilization of light.

According to the 23rd embodiment of the invention, the head mount type image display system according to any one of the 1st to the 22nd embodiment is further characterized in that the user's eye and said eyepiece window are positioned in such a relation that the visual axis of the eye does not overlap said eyepiece window, and a chief light ray through said eyepiece window is incident within a pupil diameter.

In this case, as the casing of the display system is located on the visual axis, a part of the outside that is dimmed is seen as if it overlapped an electronic image. However, if the display system is displaced from on the visual axis as mentioned above, the dimmed area of the outside and the electronic image are displayed in a mutually displaced way. Accordingly, this arrangement is effective for the case where an outside scene in the frontal direction and an electronic image are more naturally synthesized for display purposes.

According to the 24th embodiment of the invention, the head mount type image display system according to the first embodiment is further characterized in that the member that forms said eyepiece window holder has a tapered structure such that said member grows thin on the eyepiece window side and thick on the display device side.

By setting the eyepiece window portion of the member that forms the eyepiece window holder to 4 mm or less, the see-around or see-through function becomes effective. However, small-size display devices are very hard to fabricate, and their fabrication costs much. Accordingly, if the eyepiece window portion is kept as thin as 4 mm or less and the base portion away from the eyeball is made thick, it is then possible to increase display device size while the see-around or see-through function is kept intact.

According to the 25$^{th}$ embodiment of the invention, the head mount type image display system according to the first embodiment is further characterized in that a secondary image formed by transmission of an image on said display device by way of an optical fiber image guide is viewed through said eyepiece window holder and said eyepiece window.

Thus, if the image on the display device is transmitted using the optical fiber image guide to form it as a secondary image for viewing, it is then possible to space the display device and electric substrates away from the eye, getting rid of the apparent unnaturalness of the display system upon wearing.

According to the 26$^{th}$ embodiment of the invention, the head mount type image display system according to the 25$^{th}$ embodiment is further characterized in that an encrypted optical fiber image guide with irregularly arranged optical fibers is used as said optical fiber image guide, and in correspondence to said encrypted optical fiber image guide, an image is displayed on said display device in such a way as to view a secondary image as an image.

In this case, even when the same image is displayed on each terminal by way of the encrypted optical fiber image guide for the transmission of images in an irregular pattern for each terminal, there is a difference in the image pattern displayed on the display device (primary image) depending on each terminal. For this reason, when image display data generated in compliance with a certain terminal are copied and immediately displayed on other terminal, the image viewed on the other terminal will be quite nonsense.

According to the 27$^{th}$ embodiment of the invention, the head mount type image display system according to the 25$^{th}$ embodiment is further characterized in that the pitch of each pixel of said optical fiber image guide differs between on the entrance side and on the exit side such that a secondary image transmitted by way of said optical fiber image guide becomes smaller in size than an image on said display device.

The eyepiece window holder or the eyepiece window is as thin as 4 mm or less; a small-size display device fit for them is hard to fabricate, and its fabrication costs much. Therefore, if the pitch of the array of pixels on both end faces of the optical fiber image guide is varied, it is then possible to generate a secondary image smaller in size than an image on the display device. This in turn makes it possible to use a display device of larger size, thereby achieving significant cost reductions.

According to the 28$^{th}$ embodiment of the invention, the head mount type image display system according to any one of the 1$^{st}$ to the 27$^{th}$ embodiment is further characterized in that a display portion including said display device, said eyepiece window holder, said eyepiece optical system and said eyepiece window are built in a spectacle frame.

The head mount type image display system of the invention is so reduced in size and weight that its main parts can be built in spectacles in an integral way.

Some examples of the head mount type image display system of the invention will be given.

FIG. 1 is illustrative in schematic of a head mount type image display (image display system) 1 according to one example of the invention, which is mounted on the head M of the user. FIG. 2(*a*) is illustrative of the profile of the user in FIG. 1, and FIG. 2(*b*) is a view of the user as viewed from above. In this example, a small-size headphone type head supporter 10 is utilized. In FIGS. 1 and 2, an eyepiece window holder 2 with a built-in light guidance path adapted to enable a display panel positioned at the end of the face to be viewed extends from the head supporter 10 to the vicinity of the front of the eyeball E. By looking in an eyepiece window 4 at the tip of the eyepiece window holder 2, the user can take a look at a displayed image. Here, all components positioned in the frontal range of the eyeball (see FIG. 1) are set to a width of 4 mm or less.

Why all the components positioned within the frontal range of the eyeball are set to a width of 4 mm or less is now explained. The pupil diameter of a human being changes between 2 mm and 8 mm depending on brightness. When a shield matter located at the front of the eyeball, scenes in the distance can be viewed without being obstructed by that shield matter. Here, by setting a member that forms the eyepiece window holder 2 that is a casing component positioned in the frontal range of the eyeball to a size of 4 mm or less on the basis of an average pupil diameter size, the outside could be viewed without being obstructed in most of ordinary environments of use.

In the example of FIGS. 1 and 2, the head supporter 10 extending in a rod form may be made up of a fluorescent resin rod, as will be described later. The headphone type head supporter 10 may include inside an auxiliary illuminating light source, a display panel drive substrate, various control substrates, various information processing substrates, a memory, a communications function, a speaker, an operating interface, etc.

FIG. 3 is a schematic view of an exemplary arrangement wherein any light guidance path is not built in the eyepiece window holder 2, as viewed from the front. This arrangement is comprised of an image exit portion 11 held to the head supporter 10, with the display panel attached to it, the eyepiece window holder 2 held to the head supporter 10 to hold an eyepiece optical system 5, and the eyepiece optical system 5 held to the eyepiece window holder 2. Light leaving the display panel passes the outside of the eyepiece window holder 2, i.e., through the air, rather the inside thereof, entering directly the eyepiece optical system 5. The eyepiece window holder 2 here, too, is set to a width of 4 mm or less and a length of 10 mm or greater, as viewed from the frontal range of the eyeball.

With the example of FIG. 3, not only is the advantage of FIGS. 1 and 2 obtained, but also both the outside and an electronic image can be viewed in a more natural way, because the eyepiece window holder 2 is located outside of an optical path and spaced away from the center of the field of view.

FIG. 4(*a*) is a perspective view of the optical system portion in the arrangement of FIG. 1, and FIG. 4(*b*) is a view of that optical system portion as viewed from above. Image light leaving a display panel 3 built in the vicinity of the entrance end of the eyepiece window holder 2 passes through the interior of the eyepiece window holder 2, turning direction at a reflecting member 5 and entering an eyepiece window 4, leaving it in the direction of the eyeball E. The left end of the eyepiece window holder 2 is actually linked to the head supporter 10, whereby it is held to the head M. The eyepiece window holder 2 here is set to a width of 4 mm or less and a length of 10 mm or greater, as viewed in the direction of the viewer. Any desired member could be used for the reflecting member 6 here provided that it is capable of reflecting light rays; for instance, a prism or a mirror could be used. Any desired small-format display panel could be used for the display panel 3 here; for instance, use could be made of a transmission or reflection type liquid crystal display device, and a self-emission type organic or inorganic EL device.

FIG. 5 is illustrative of one basic arrangement of the head mount type image display system according to the invention. The display panel 3 is located at a position before the near point adjustment limit, and image light from it is projected by an eyepiece lens 5 onto the eyeball E, so that the viewer can view an aerial image 3' that is a virtual image of an image on the display panel 3 on a magnified scale. Such arrangement ensures that even with a small-format display panel (display panel 3), an image displayed on it can be viewed at a large angle of view.

Any desired optical system could be used for the eyepiece lens 5 provided that it has a positive refracting power; for instance, a convex lens, a concave mirror, and an index-inhomogeneous lens could be used. Alternatively, a positive lens group comprising a combination of multiple optical elements having a positive or negative refracting power could be used for that convex lens 5.

FIG. 6 is illustrative in schematic of how the outside is shielded by the display system of the invention. FIG. 6 teaches a principle of, even when there is a sort of shield matter (the casing of the display system in this example: primarily corresponding to the eyepiece window holder 2 in FIGS. 1 to 4) found at the front of the eyeball E, why an outside image in the distance is not perfectly shielded off on condition that the shield matter is thinner than the pupil diameter. Assume here that light coming from a point in the distance is incident light. Then, this light is incident on the eyeball E as substantially parallel light. Here, if the shield matter is smaller than the pupil diameter, a part of parallel light passes through the pupil, forming an image on a corresponding point on the retina. Therefore, even with the shield matter (the casing of the display system) or the like found at the front of the eyeball, outside information can be viewed without being lost (the see-through feature) on condition that it is thinner than the pupil diameter.

Referring to FIG. 6, when the outside grows bright and the user's pupil constricts, there is a phenomenon that the field of outside view in the frontal direction of the eyeball is cut off, so that the user cannot view the field of outside view. Here, if the shield matter (the casing of the display system) is displaced from the frontal (visual axis) direction of the eyeball as shown in FIG. 7(*a*), it is then possible to view an outside image in a more natural way. In addition, it is then possible to view an aerial image formed by the display system and obtain the impeccable see-through effect, although the shield matter is positioned at the end of the pupil. In other words, if the optical axis (visual axis) of the eyeball of the user who views the outside is mutually parallel with the optical axis of the display system of the invention as shown typically in the optical path diagram of FIG. 7(*b*), an outside image could then be seen as if the image on the displays system of the invention overlapped it (the see-through feature).

As described above, the eyepiece window holder 2 that is a sort of shield matter positioned in front of the eyeball E is constructed in such a way as to have a length of 10 mm or greater and be thinner than the human being's average pupil diameter of 4 mm; as shown in FIG. 6, light beams from the outside are not completely cut off, so that an outside image on the side of the eyepiece window holder 2 that faces away from the eyeball E is visible as if it were seen through the eyepiece window holder 2. Because extraneous light is unlikely to pass through the interior of the eyepiece window holder 2, it is possible to eliminate unnecessary reflection that is a problem with the prior art. That is, there is the see-around effect obtainable, which has the features of:

"low weight and small size",
"no ghost", and
"large field of outside view".

One exemplary arrangement of the optical system incorporated in the eyepiece window holder 2 is now described. FIG. 8(*a*) is illustrative of its basic arrangement that is comprised of the eyepiece window holder 2 adapted to guide light from the display panel 3, the reflecting member 6 adapted to turn it toward the direction of the eyeball, and the eyepiece lens 5. This structure ensures that the bulky display panel 3 is spaced away from the eyeball as much as possible so that the width of the site included in the frontal range of the eyeball can be narrowed down.

As regards the FIG. 8(*a*) structure, however, there are problems that the size of the display panel 3 is limited by the diameter of the member that forms the eyepiece window holder 2, and when the length of the eyepiece window holder 2 is increased, it is impossible to make the angle of the view of the display screen large. Here, if the member that forms the eyepiece window holder 2 is configured into a tapered structure, as shown in FIG. 8(*b*), it is then possible to narrow the portion positioned in the frontal range of the eyeball as much as possible and make the portion of the display panel 3 large. As a result, it is possible to use the display panel 3 that has an easy-to-fabricate size and take advantage of a large angle of view.

FIGS. 9(*a*) and 9(*b*) are illustrative of an angle-of-view difference between the structures shown in FIG. 8(*a*) and FIG. 8(*b*). More specifically, FIG. 9(*a*) is illustrative of the structure of a casing $2_1$ having the same diameter all across, which forms part of the eyepiece window holder 2, and FIG. 9(*b*) is illustrative of a casing $2_2$ having a tapered structure that is thin on the eyepiece lens 5 side and thick on the display panel 3 side. For instance, consider here the condition under which a portion from near the center of the casing $2_1$, $2_2$ to the eyepiece lens 5 comes within the front range of the eyeball. From a comparison of FIG. 9(*a*) with FIG. 9(*b*), it is found that even when the diameter of both the casings within the frontal range of the eyeball is 4 mm or less, the casing $2_2$ of FIG. 9(*b*) having a tapered structure is more preferable, because there is a larger angle of view obtainable with an increase the size of the display plane 3. In FIG. 9, an optical axis is indicated by reference numeral 21, and a light ray from the end of the display panel 3 by reference numeral 22.

Thus, by making the casing within the frontal range of the eyeball as thin as possible, the outside can be viewed more clearly, and by increasing the size of the display panel 3, the angle of view can be so increased that a lot more information can be presented, and the fabrication of the display panel 3 can be facilitated as well.

As can be seen from the foregoing, the smaller the size of an aperture portion of the eyepiece lens 5, the smaller the display system of the invention can become, resulting in a structure that is of lower weight and less likely to cover the wearer's eye. As the casing of the display system that is a sort of shield matter to the eyeball becomes small, it enables the see-through effect to be obtained in a more natural way, and the natural expressions of the wearer to be more easily conveyed to a third person.

On the contrary, there is a decrease in the quantity of light incident on the eyeball through the aperture of the eyepiece lens 5, which in turn causes the luminance of the display screen to drop apparently, and renders adjustment of the eyeball with respect to the position of the eyepiece lens 5 difficult.

Regarding reductions of the aperture size of the eyepiece lens 5, it is noted that reductions of the aperture size in the longitudinal direction of the eyepiece window holder 2 that is the casing component positioned at the front of the eyeball, viz., in the transverse direction of the screen, does not contribute much to such size reductions.

It is therefore preferable to diminish the aperture (eyepiece window 4) of the eyepiece lens 5 in the direction vertical to the longitudinal direction of the casing component positioned at the front of the eyeball E, viz., in the vertical direction alone of this exemplary arrangement, as shown in FIG. 10(*a*) that is a perspective view of the exemplary arrangement of FIG. 8, FIG. 10(*b*) that is illustrative of the position of the eyeball E with respect to the tip of the eyepiece window holder 2 upon viewing, and FIG. 10(*c*) that is illustrative of the relation of the eyepiece window 4 to pupil diameter size again upon viewing, because size reductions, improvements in the see-through effect, etc. are achievable, and demerits such as luminance drops can be minimized as well.

In other words, if the eyepiece window 4 of the eyepiece lens 5 is configured into a rectangular shape that becomes long in the longitudinal direction of the eyepiece window holder 2, it is then possible to achieve a head mount type image display system that is diminished in size, improved in the see-through effect, and free of luminance drops, and is easier to use as well.

Consider here an easier-to-see configuration of the eyepiece window 4 with the see-through effect intact. Then, its size should preferably be smaller in the vertical direction, and larger in the horizontal direction, than the pupil diameter. Because the human being's average pupil diameter is 4 mm, it is preferable to use the eyepiece window 4 that satisfies the condition that its vertical size is 4 mm or less and its horizontal size is 4 mm or greater, because there are easy-to-see displays obtainable in a lot more viewing situations.

FIG. 11 is illustrative of the horizontal width of an eye point depending on the horizontal length of the eyepiece window 4. However, if the eyepiece window 4 becomes longer in the horizontal direction (the longitudinal direction of the eyepiece window holder 2) as shown in FIG. 11(*b*), the eye point then becomes wider as compared with where the horizontal size of the eyepiece window 4 of FIG. 11(*a*) is smaller, so that the position of the eye with respect to the eyepiece window 4 is more easily adjusted, and the quantity of light brought in from the eyepiece window 4 becomes larger, making it possible to view brighter images.

FIG. 12 is illustrative of an exemplary arrangement where two reflecting members 6, 6' are used in the optical path through the eyepiece window holder 2. Bending the optical path twice by two reflecting members 6, 6' is often effective for the location of a back light, and the link of the eyepiece window holder 2 to the head supporter 10. In other words, the optical path being bent twice contributes to an increase in the degree of flexibility in layout.

FIG. 13 is illustrative of an example of building an optical system in the eyepiece window holder 2, wherein a gradient index lens 23 is used for that optical system. By use of such a gradient index lens 23, a display surface having an increased angle of view is achievable at the diameter of the thin eyepiece window holder 2 rather than with the eyepiece optical system comprising an ordinary convex lens. In this regard, FIG. 13(*b*) shows an angle of view at the time when the eyepiece optical system is made up of the ordinary eyepiece lens (convex lens) 5, and FIG. 13(*c*) shows an angle of view at the time when it is made up of the gradient index lens 23. Regarding light rays 22 leaving the end of the display panel 3 and passing through the center of the eyepiece window, they leave the eyepiece window via the light guidance path in either case. However, in the arrangement of FIG. 13(*c*) using the gradient index lens 23, the light rays 22 change direction gradually, whereas in the arrangement of FIG. 13(*b*) using the ordinary eyepiece lens 5, the light rays 22 travel linearly; there is a difference in the angle subtended (angle of view) upon leaving. It is thus found that the use of the gradient index lens 23 of FIG. 13(*c*) contributes more to an increase in the angle of view.

Thus, by use of the gradient index lens 23 as the eyepiece optical system in the eyepiece window holder 2, a larger angle of view is achievable at a thinner diameter.

Consider here the relations of the effective diameter of the display panel 3 to the focal length of the eyepiece lens 5. FIG. 14 is illustrative of relations among various parameters of the display system in the display system according to the invention. Paraxial optics theory teaches that when the diagonal size (effective diameter) of an effective display surface of the display system is represented by D, a half angle of an electronic image field of view by $\omega/2$, and the focal length of the eyepiece optical system by f, there are the following relations:

$$\omega/2 = (D/2)/f \tag{1}$$

When the maximum angle of inclination of a chief ray at which the chief ray can pass through the user's pupil is represented by $\xi$, the user's pupil diameter by d, and the working distance by W, there are the following relations:

$$\xi = (d/2)/W \tag{2}$$

The condition for ensuring that an image is clearly seen as far as its periphery is $$\omega/2 < \xi \tag{3}$$

Then, $$D/f < d/W \tag{4}$$

Here, the user's pupil diameter d is at most about 5 mm, and with interferences by eyelashes at the time of blinking, etc. in mind, the working distance W to be taken is about 10 mm. Then, the substitution of d=5 mm and W=10 mm for inequality (4) gives $$D/f < 0.5 \tag{5}$$

Here, if the exit pupil of the display system is positioned near the eyepiece window or between the eyepiece window and the pupil of the user's eye, it is then possible to reduce the shading of light beams at the periphery of the image under observation. Even so, as D/f exceeds 0.5 that is the upper limit to inequality (5), it causes shading to take place.

Thus, it is preferable for the optical system in the display system of the invention to satisfy the condition D/f<0.5, because it is then possible to achieve a display system that, albeit being a small-format system, enables electronic images to be viewed without shading.

Referring here to the illuminating light source for the display panel 3 of the display system according to the invention, it is desired to make use of extraneous light. In this case, that illuminating light source may be made up of a fluorescent resin rod, as set forth below.

FIG. 15 is illustrative of the fluorescent resin rod adapted to use extraneous light as back light. The fluorescent resin rod indicated by 30 is a member obtained by processing a resin containing a fluorescent substance 41 into a rod form. As extraneous light 42 is incident on the side or the like of that fluorescent resin rod 30, it is once absorbed in the fluorescent substance 41, and then, light is emitted with that fluorescent substance 41 as a light source. Here, when that member is in a rod form, light 43 emitted from inside is subjected to repetitive total reflections at its internal side, leaving the end face of the rod. In other words, the light emitted inside, and confined within, the rod leaves the rod's end face, so that the rod's end face gives out very bright light. With nothing applied, the light will be emanated out of the end face of the rod that faces away from the end face of the rod with light as back light. However, if the unavailable end face is configured as a mirror 44, light reflected at it will be then emanated out of the available end face only, so that such light can be effectively used as back light. Instead of the mirror 44, a metal thin film could be vapor deposited onto the rod's end face, or a prism harnessing total reflection like a corner cube could be used.

In some cases, extraneous light 42 incident from the side of the member processed into a rod form, too, is not absorbed in the fluorescent substance 41, or light that does not satisfy the total reflection condition for the rod leaks out of the side. However, if the mirror 45 is located on the side on which the extraneous light 42 is not incident or the portion that turns inside upon mounting, then a part of unused light can be reused.

As the illuminating light obtained with that rod arrangement is used as illuminating light 46 for the display panel 3, it causes the brightness of illuminating light 46 to change depending on the brightness of the outside. This phenomenon is in coincidence with an available scene at the time of using the see-through function, generally where when the outside is bright, bright illumination is needed, and when the outside is dark, dim illumination is only needed.

FIGS. 16 and 17 are illustrative of exemplary arrangements of the display system that utilizes such a fluorescent resin rod 30. In any case, illuminating light leaving the end face of the fluorescent resin rod 30 is incident on the display panel 31 or 36, and image light from the display panel 31 or 37 makes its way through the eyepiece window holder 2, leaving the eyepiece window 4. The fluorescent resin rod 30 here is connected to the head supporter 10 or, alternatively, the fluorescent resin rod 30 per se could be used as part of the head supporter 10.

FIGS. 16(a), 16(b) and 17(a) are illustrative of an exemplary arrangement that incorporates a transmission type display panel 31, and FIG. 17(b) is illustrative of an exemplary arrangement that incorporates a reflection type display panel 36. In the case of FIG. 17(b) where illuminating light 46 is incident from the front of the reflection type display panel 36, an optical path split optical element 49 such as a half-silvered mirror is located on the display side of the reflection type display panel 36.

FIG. 18 is illustrative of an exemplary arrangement where a fluorescent resin member and a light guidance sheet are combined into a display panel back light. Referring specifically to FIG. 18(a), an exit groove 47 is provided in a part of a fluorescent resin sheet 30' configured into a sheet form, so that light leaving that portion can be used as back light for the display panel 31. Referring next to FIG. 18(b), light leaving one end of the fluorescent resin rod 30 is entered in a light guidance sheet 48 that is another member connected to the fluorescent resin rod 30, and light guided toward the display panel 31 leaves the side of the light guidance sheet 47, thereby illuminating the display panel 31. Thus, if the fluorescent resin member is combined with the light guidance sheet, it is then possible to use extraneous light to illuminate the display panel. Further, by use of such a light guidance sheet, it is possible to provide uniform illumination all across the display panel even when the end face of the fluorescent resin rod is smaller than the display panel.

Thus, by use of the fluorescent resin member as back light, extraneous light can be utilized for the illumination of the display panel, so that there can be lower power consumption. Further, because the quantity of illuminating light changes naturally depending on the brightness of the outside, proper illumination is achievable depending on available environments yet without recourse to any special sensor. Furthermore, a back light that utilizes extraneous light can be fabricated at lower costs.

FIG. 19 is illustrative of another exemplary arrangement using the fluorescent resin rod 30. In FIG. 19, a transmission type liquid crystal display device 31 is used as the display device, and the aforesaid fluorescent resin rod 30 is used for the illumination of that display device 31. The fluorescent resin rod 30 emits light through self-fluorescence upon irradiated with extraneous light, and the ensuing light is subjected to total reflection inside the fluorescent resin rod 30, leaving its end face. That light travels through a reflecting prism 33 and an illuminating lens 32 to illuminate the display device 31 by illuminating light from self-fluorescence. The end face of the fluorescent resin rod 30 that faces away from the transmission type liquid crystal display device 31 is configured into the shape of a total reflection prism (corner cube) 34, so that fluorescent light traveling away from the display device 31 is turned back for reuse. In this example, a total reflection type transparent rod 9 that is 90° at one end is located between the display device 31 and the eyepiece window 4, a convex lens 15 that forms an eyepiece lens is applied onto the position of the eyepiece window 4 at an exit end where the optical path through the transparent rod 9 is bent 90°, and the whole is covered up with the eyepiece window holder 2. The convex lens 15 here that is an eyepiece lens is integral with the eyepiece window 4. With this example where the fluorescent resin rod 30 is utilized as the illuminating light source adapted to illuminate the display device 31, the power consumption of the head mount type image display system can be kept lower. Further, when the outside is bright, the luminance of the light source grows high, thereby eliminating an inconvenience that an electronic image is outdone by the brightness of the outside and so becomes hard to be visible. In the example of FIG. 19, when the fluorescent resin rod 30 is not in use, it can be folded down in a direction indicated by an arrow with a hinge rotation shaft 35 as a center for storage. This arrangement ensures that the fluorescent resin rod is folded down together with spectacles for storage.

FIG. 21 is illustrative of an example wherein the head mount type image display system of the invention is mounted on ordinary spectacles. The fluorescent resin rod 30 is disposed along a spectacle frame 50. Light from the rod's end face is once bent by the reflecting member to 90°, and entered in the display panel 31. Image light from the display panel 31 is guided through the eyepiece window holder 2, leaving the eyepiece window 4. Other end face of the fluorescent resin rod 30 here could be provided with a mirror 44 so as to make more efficient use of light. Alternatively, a mirror 45 could be disposed at a boundary, upon which extraneous light 42 does not strike, between the spectacle frame 50 and the fluorescent resin rod 30. Further, if an auxiliary light source 37 is utilized, it is then possible to use the spectacles even in quite a dark place. In this example, the auxiliary light source 37 is disposed at the other end of the fluorescent resin rod 30 for the purpose of using the mirror 44 and the auxiliary light source 37 in a switchover way.

The light emanating from the auxiliary light source 37 should preferably be in coincidence with a wavelength band at which the fluorescent substance of the fluorescent resin rod 30 can be excited, whereby the fluorescent resin rod 30 is efficiently excited by auxiliary light from the auxiliary light source 37. This in turn allows the display panel 31 to be illuminated by this fluorescence; the auxiliary light source 37 makes sure bright illumination at lower power consumption.

Alternatively, the wavelength of light emitted by the auxiliary light source 37 should preferably not be at a wavelength band at which the absorptance of the fluorescent resin rod 30 grows large. This enables the display panel 31 to be illuminated without the light emitted by the auxiliary light source 37 being absorbed in the fluorescent resin rod 30; the auxiliary light source 37 makes sure bright illumination at lower power consumption.

Further, the color of light emitted by the auxiliary light source 37 could be different from the fluorescent color emitted by the fluorescent resin rod 30. This ensures that whenever necessary, the user's attention may be drawn by putting the auxiliary light source 37 on and off. By this blinking operation, the image being viewed by the user changes in terms of not only brightness but also color, drawing the user's attention.

Furthermore, even when electric substrates, wirings, etc. are located on a portion that is not irradiated with light at the time of mounting the fluorescent resin rod 30 on the side of the head, there is no obstacle to the incidence of extraneous light at all.

Thus, by mounting the head mount type image display system of the invention to ordinary eyeglasses, it is possible for even an ordinary spectacle wearer to make use of the head mount type image display system of the invention. In this case, if the image display system is provided with the auxiliary light source, then it can address dark environments as well. Further, if the fluorescent resin rod is used as the illuminating light source that utilizes extraneous light and the auxiliary light source is selected in consideration of the wavelength absorbed by its fluorescent resin, it is then possible to make power consumption low. As the auxiliary light source that emits light having a wavelength different from that of the fluorescent color of that fluorescent resin is used, it may be used as a warning signal. Further, as wirings, substrates or the like are located on the side of the fluorescent resin rod that faces away from the portion adapted to receive light, there is no obstacle to the incidence of light.

FIG. 22 is illustrative of an example of incorporating the head mount type image display system of the invention in a spectacle frame. The eyepiece window holder 2 is built in spectacle frames 50. In FIG. 22, there is the eyepiece window 4 below the middle of a spectacle lens 51, from which image light goes out. Thus, if the head mount type image display system of the invention is incorporated in the spectacle frames from the beginning, it is then possible to dispense with awkward mounting operations and so any mount mechanisms, thereby making more natural designs possible.

FIG. 23 is illustrative of an exemplary arrangement utilizing an optical fiber image guide. For the head mount type image display system, it is important to get rid of hassles at the time of mounting. Reducing the size of components located near the eye as much as possible may work for this purpose. So far, the display panel has been located near the eye; the components located near the eye have become bulky. Therefore, if the display panel 3 is spaced away from near the eye and an image from the display panel 3 is transmitted as a secondary image through an optical fiber image guide 55 to near the eye so that the transmitted secondary image can be viewed by the optical system on a magnified scale, it is then possible to diminish the components located near the eye as much as possible. Further, the optical fiber image guide 55, because of having some pliability, could be used even in a folded state well compatible with various designs and adjustment mechanisms.

FIG. 23 is illustrative of how the display panel 3 receives, and displays, images or information from a controller 56 radio connected to it. The controller 56 here is understood to refer to an exclusive controller, a cellular phone, a personal digital assistant (PDA), and all.

As described above, by transmitting an image from the display panel as a secondary image by way of the optical fiber image guide, it is not necessary to locate the display panel, wirings, electric substrates or the like near the eye; it is possible to prevent the components near the eye from growing bulky, which have an adverse influence on the sense of wearing or designs. Further, the optical fiber image guide, because of having some pliability, could be used even in a folded state well compatible with various designs and adjustment mechanisms.

In such arrangement as shown in FIG. 23, as the radio exchange of images and information becomes popular, there would be a leakage problem with information. Only by use of electric or software countermeasures, there would often be apprehension. Effective to that case is a head mount type image display system that incorporates an encrypted optical image fiber guide. FIG. 24 is illustrative of the arrangement and operation of an encrypted optical fiber image guide 37. An ordinary optical fiber image guide is adapted to transmit an image displayed on the display panel 3 while its pattern is kept. For instance, with one optical fiber meted per pixel on the display panel 3, the image is transmitted while the relative locations of pixels are maintained. The encrypted optical fiber image guide here is understood to refer to one wherein one optical fiber 58 is allocated to one pixel on the display panel 3, and in the course of transmission, the relative locations of the optical fibers 58 are interchanged at random, thereby displaying an image quite different in pattern from the image on the display panel 3. In FIG. 23, there is quite a nonsense image displayed on the display panel 3, but the locations of the optical fibers 58 for the transmission of it are mutually interchanged, so that there is a capital "F" displayed on a secondary image after that transmission.

By previously learning in what relations the pixels on the display panel 3 correspond to the pixels on the transmitted secondary image, an image actually displayed on the display panel 3 is interchanged in pixel unit in such a way as to look as a straightened-up secondary image. Utterly nonsense image information is transmitted as that interchanged image from the controller 56 side; even though a third person intercepts it, it will look as quite a nonsense image to make sure security. Further, this encrypted optical fiber image guide 57 has an inherent feature differing per product; even when the same product is used, there will be no interception by a third person (FIG. 26).

Thus, in the radio transmission of images or information from a controller (an image data transmission portion) separate from the display portion, not only can software or electric security counteractions be taken, but physical (optical) security can also be ensured.

FIG. 25 is illustrative of an image compression optical fiber image guide 55'. With the state of the art, very small display panels are difficult to fabricate, and cost much, eve if somehow fabricated. Therefore, if a display panel of easy-to-fabricate size is mounted on a less obstructive site and a secondary image smaller than the display panel 3 is formed by the image compression optical fiber image guide 55' to view it through an optical system, it is then possible to achieve a head mount type image display system that, albeit using a large display panel, can be mounted on a compact site near the eye.

Thus, by use of the image compression optical fiber image guide, an image smaller than a practical display panel can be displayed as a secondary image near the eye. For the head mount type image display system of the invention, an extremely small display panel is used; however, the use of the image compression optical fiber image guide ensures that an easy-to-fabricate, somewhat large display panel can be used at a reasonably low cost.

FIG. 26 is illustrative in schematic of contents distribution for a system that incorporates such an encrypted optical fiber image guide as shown in FIG. 24. There are products numbered 1, 2, and 3, where the encrypted optical fiber image guide differs in location, with an encryption code encoded by analysis of them. A contents distribution center has information on the encryption code corresponding to the respective product numbers, and carries out image processing on the basis of it. And then, the center distributes the processed contents data to a person who has a certain specific product number. As a consequence, that contents data can be reproduced by, and viewed through, a product having a certain specific number alone. When such contents data are copied to another product or illegally obtained, quite a nonsense image will be only obtained upon reproduction on another product. Therefore, it is possible to resolve a problem with illegal copying or use that arises in digital contents distribution.

For instance, the aforesaid head mount type image display system of the invention may be embodied as follows.

[1] A head mount type image display system at least comprising a display device, an eyepiece optical system, an eyepiece window, an eyepiece window holder, a casing and a supporter for fixing all these components onto a user's head, wherein said casing covers said display device, said eyepiece window holder holds said eyepiece window within a user's field of view, said eyepiece optical system forms a virtual image of an image displayed on said display device, said eyepiece window allows a light beam for forming said virtual image to be directed to a user's eye and leave it, and a member that forms said eyepiece window holder is such that, in a range of 10 mm or greater from said eyepiece window toward a base, a width of projection section in a user's visual axis direction is 4 mm or less except some projection, and has a see-around mechanism.

[2] A head mount type image display system as recited in [1] above, characterized in that the member to form said eyepiece window is of 4 mm or less in the width of projection section in the user's visual axis direction, and has a see-through function.

[3] A head mount type image display system as recited in [1] or [2] above, characterized in that between said eyepiece window holder and said eyepiece window, there is a total reflection mirror or prism located, which is adapted to bend an optical axis in the user's eye direction.

[4] A head mount type image display system as recited in any one of [1] to [3] above, characterized in that said eyepiece window holder is held in such a way as to be substantially horizontally located upon mounted onto the head.

[5] A head mount type image display system as recited in [3] above, characterized in that the whole of said eyepiece window and said total reflection mirror or the whole of said eyepiece window and said total reflection prism has a rotation mechanism, by which rotation can be adjusted with a longitudinal direction of said eyepiece window holder as a rotation axis.

[6] A head mount type image display system as recited in [3] above, characterized by comprising a rotation mechanism, by which a user can adjust rotation of said display device with a direction vertical to a display surface of said display device as a rotation axis.

[7] A head mount type image display system as recited in any one of [1] to [6] above, characterized in that a part or the whole of said eyepiece optical system is integral with said eyepiece window.

[8] A head mount type image display system as recited in any one of [1] to [7] above, characterized in that a part or the whole of said eyepiece optical system is built in said eyepiece window holder.

[9] A head mount type image display system as recited in [8] above, characterized in that said eyepiece optical system built in said eyepiece window holder is an optical system that has an action of converging a parallel light beam.

[10] A head mount type image display system as recited in any one of [1] to [9] above, characterized in that said eyepiece window has a rectangular shape whose long side is in the same direction as the longitudinal direction of said eyepiece window holder.

[11] A head mount type image display system as recited in any one of [1] to [9] above, characterized in that said eyepiece window has an aperture size that is smaller than a pupil diameter in a vertical direction and larger than a pupil diameter in a horizontal direction.

[12] A head mount type image display system as recited in any one of [1] to [9] above, characterized in that said eyepiece window has an aperture size that is 4 mm or less in a vertical direction and 4 mm or greater in a horizontal direction.

[13] A head mount type image display system as recited in any one of [1] to [12] above, characterized in that said casing and said eyepiece window holder are joined together by way of a total reflection mirror or prism, or an optical fiber image guide.

[14] A head mount type image display system as recited in any one of [1] to [13] above, characterized in that there is an illumination portion, and said illumination portion and said casing are joined together by way of a total reflection mirror or prism, a light guide sheet, or a light guide.

[15] A head mount type image display system as recited in [9] above, characterized in that said eyepiece optical system comprises a convex lens.

[16] A head mount type image display system as recited in [8] or [9] above, characterized in that said eyepiece optical system comprises an optical medium whose refractive index grows gradually high in a radial direction.

[17] A head mount type image display system as recited in any one of [1] to [16] above, characterized by satisfying $D/f<0.5$ where D is a diagonal dimension of an effective display surface of said display device, and f is a focal length of said eyepiece optical system.

[18] A head mount type image display system as recited in [17] above, characterized in that an exit pupil is positioned near said eyepiece window or between said eyepiece window and the pupil of a user's eye.

[19] A head mount type image display system as recited in [1] above, characterized in that an electronic image-formation light beam leaving said display device passes outside of said eyepiece window holder.

[20] A head mount type image display system as recited in [1] above, characterized by including an illuminating light source for illuminating said display device, which is made up of a fluorescent resin rod.

[21] A head mount type image display system as recited in [20] above, characterized in that an end face of said fluorescent resin rod that faces away from a display panel is mirror coated or in a corner cube shape.

[22] A head mount type image display system as recited in [20] above, characterized in that there is a mirror located on a side of said fluorescent resin rod, on which no extraneous light is incident.

[23] A head mount type image display system as recited in any one of [1] to [22], characterized in that the user's eye and said eyepiece window are positioned in such a relation that the visual axis of the eye does not overlap said eyepiece window, and a chief light ray through said eyepiece window is incident within a pupil diameter.

[24] A head mount type image display system as recited in [1] above, characterized in that the member that forms said eyepiece window holder has a tapered structure such that said member grows thin on an eyepiece window side and thick on a display device side.

[25] A head mount type image display system as recited in [1] above, characterized in that a secondary image formed by transmission of an image on said display device by way of an optical fiber image guide is viewed through said eyepiece window holder and said eyepiece window.

[26] A head mount type image display system as recited in [25] above, characterized in that an encrypted optical fiber image guide with irregularly arranged optical fibers is used as said optical fiber image guide, and in correspondence to said encrypted optical fiber image guide, an image is displayed on said display device in such a way as to view a secondary image as an image.

[27] A head mount type image display system as recited in [25] above, characterized in that a pitch of each pixel of said optical fiber image guide differs between on an entrance side and on an exit side such that a secondary image transmitted by way of said optical fiber image guide becomes smaller in size than an image on said display device.

[28] A head mount type image display system as recited in any one of [1] to [27] above, characterized in that a display portion including said display device, said eyepiece window holder, said eyepiece optical system and said eyepiece window are built in a spectacle frame.

BRIEF EXPLANATION OF THE DRAWINGS

[FIG. 2]

[FIG. 4] FIG. 4(a) is a perspective view of an optical system portion in the arrangement of FIG. 1, and FIG. 4(b) is a view of that optical system portion as viewed from above.

[FIG. 8] is illustrative of an exemplary arrangement of the optical system built in the eyepiece window holder.

[FIG. 9] is illustrative of an angle-of-view difference between the structures of FIGS. 8(a) and 8(b).

[FIG. 10]

EXPLANATION OF REFERENCE NUMERALS

Figure 1:
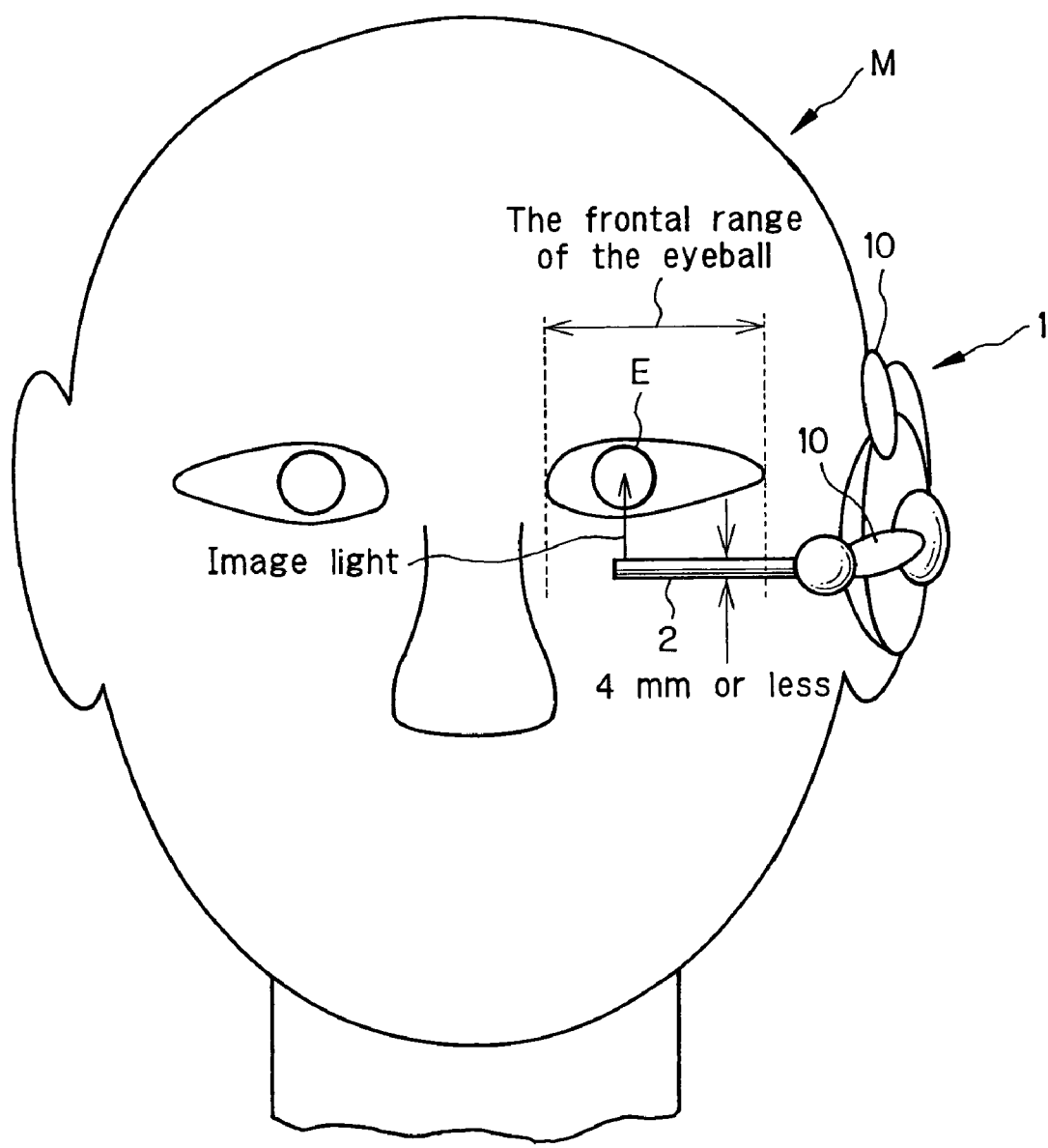
[FIG. 1] is illustrative in schematic of the head mount type display according to one example of the invention, which is mounted on the user's head, as viewed from the front.
Figure 2A:
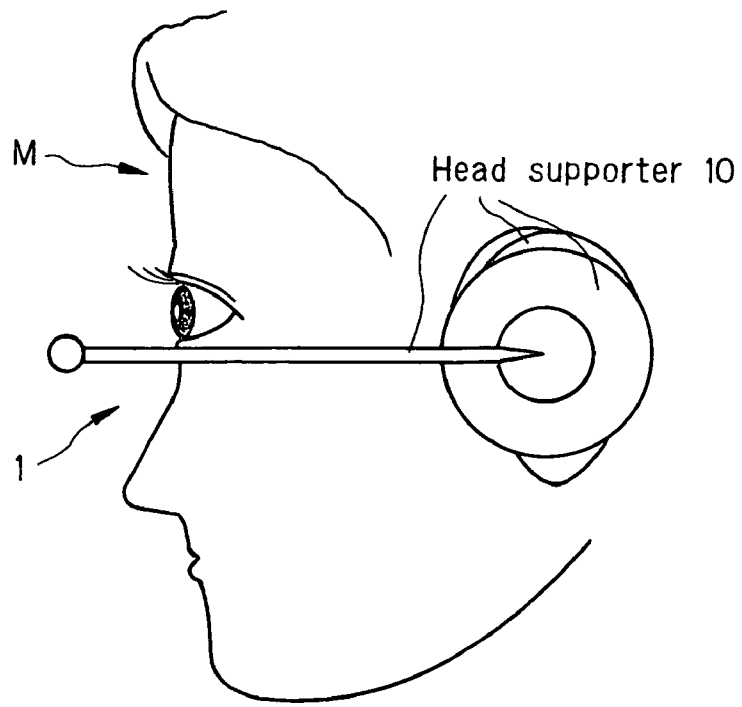
FIG. 2(a) is a view of the profile of FIG. 1.
Figure 2B:
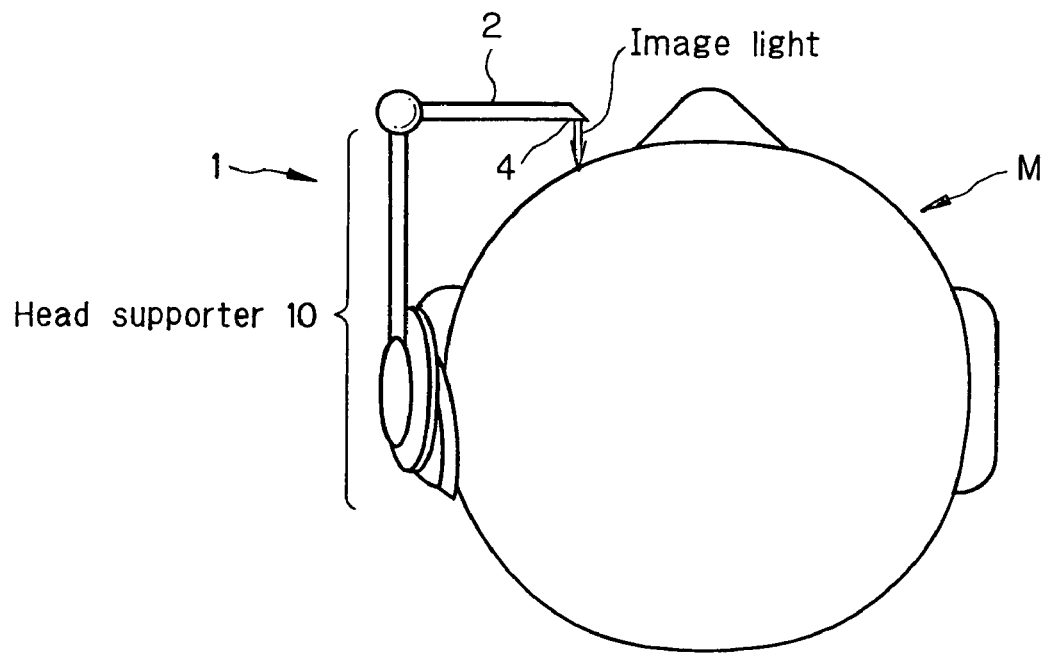
FIG. 2(b) is a view as viewed from above.
Figure 3:
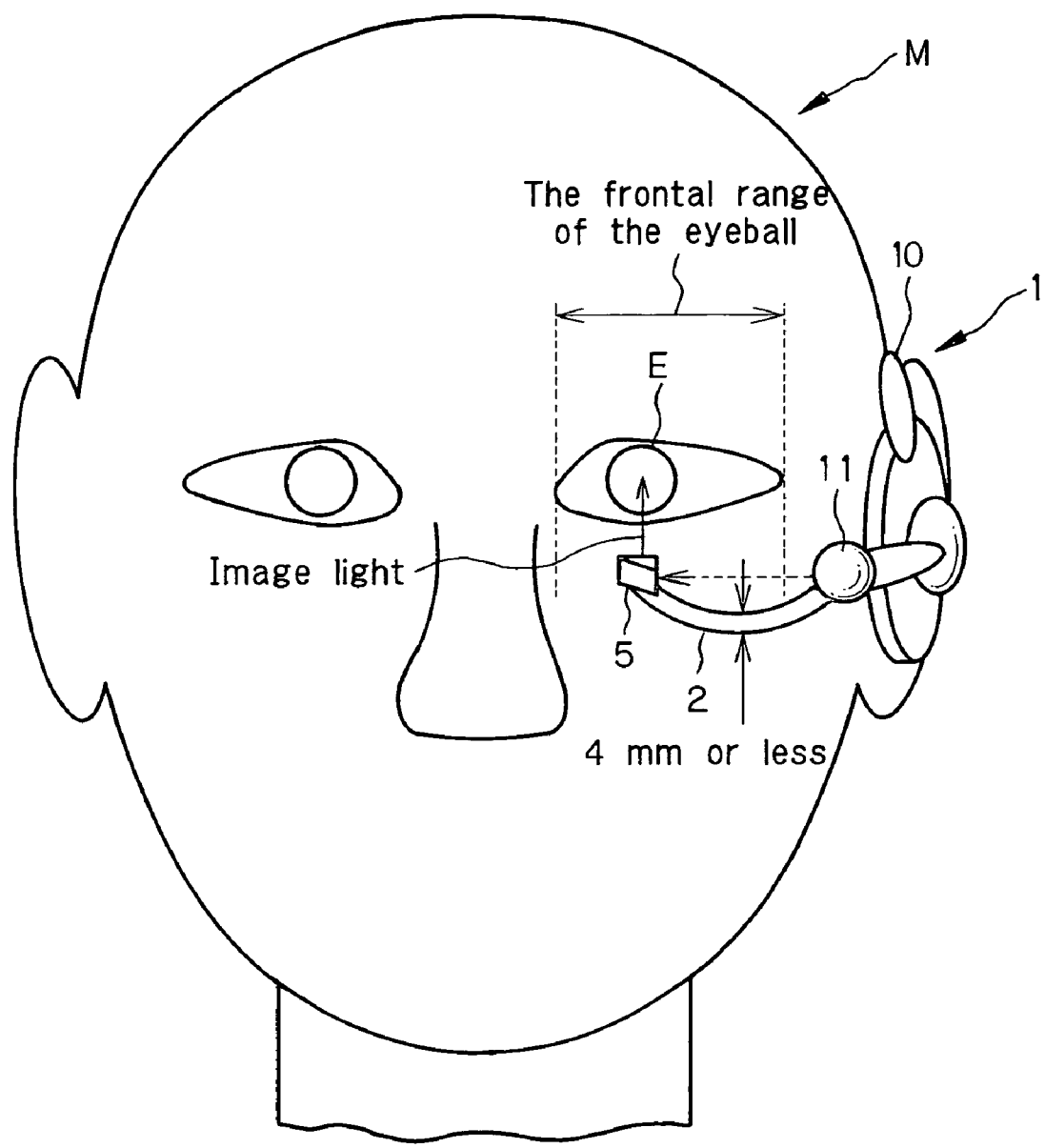
[FIG. 3] is illustrative in schematic of an exemplary arrangement wherein the light guidance path is not built in the eyepiece window holder.
Figure 5:
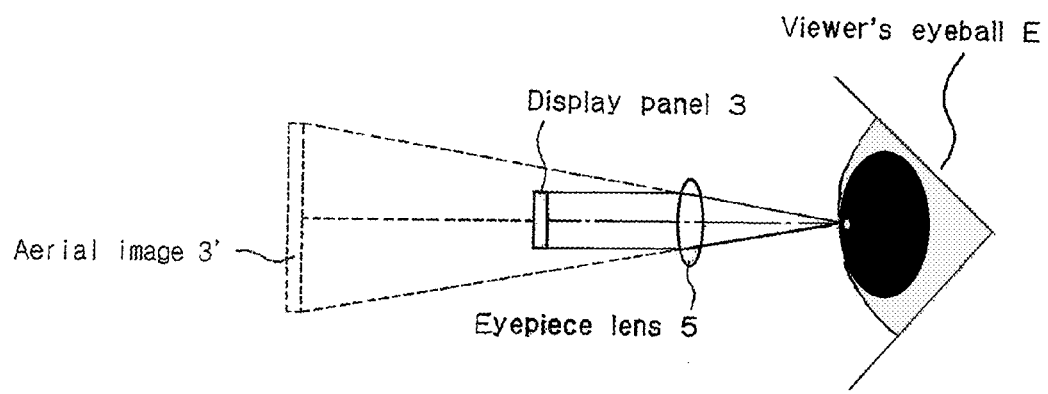
[FIG. 5] is illustrative of the basic arrangement of the optical system in the head mount type image display system according to the invention.
Figure 6:
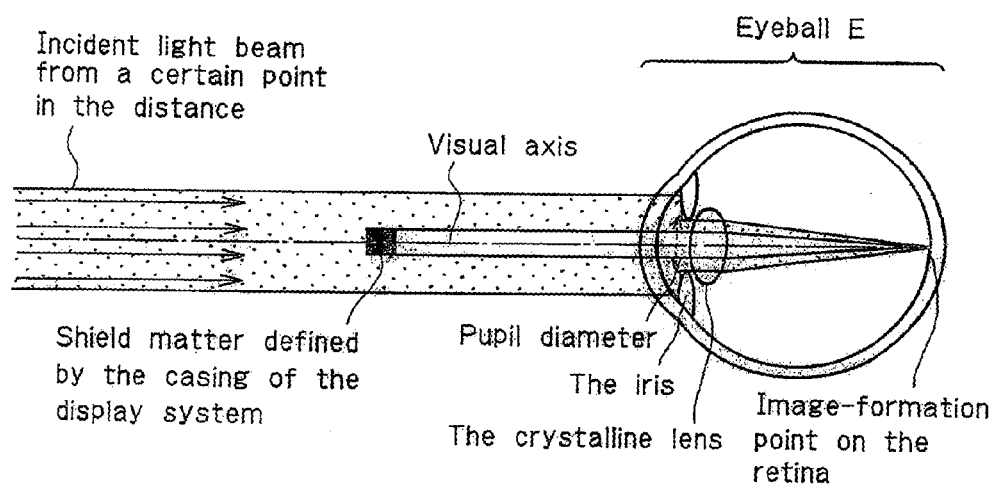
[FIG. 6] is illustrative of the principles of the head mount type image display system according to the invention, whereby an outside image is visible as if it were seen through the eyepiece holder without a light beam from the outside being not perfectly cut off.
Figure 7A:
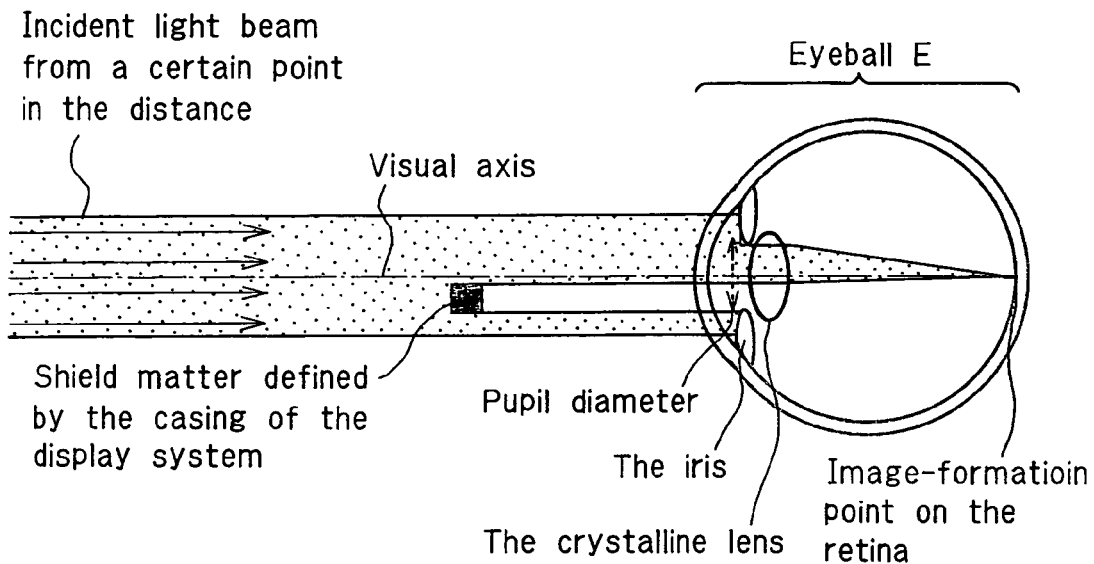
[FIG. 7] is illustrative of why an outside image, too, can be naturally viewed by displacing a sort of shield matter from the frontal direction of the eyeball.
Figure 7B:
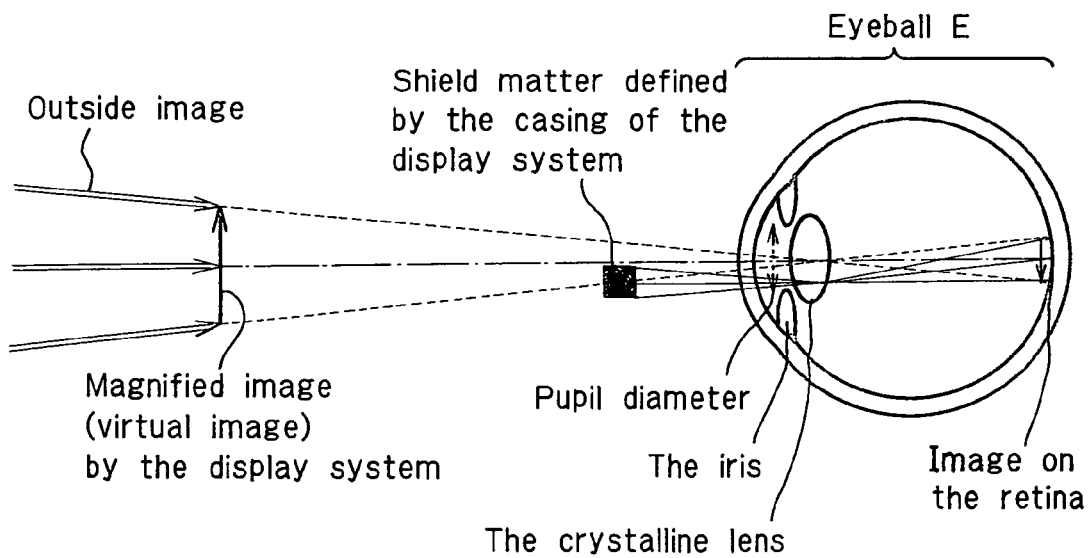
Figure 8A:
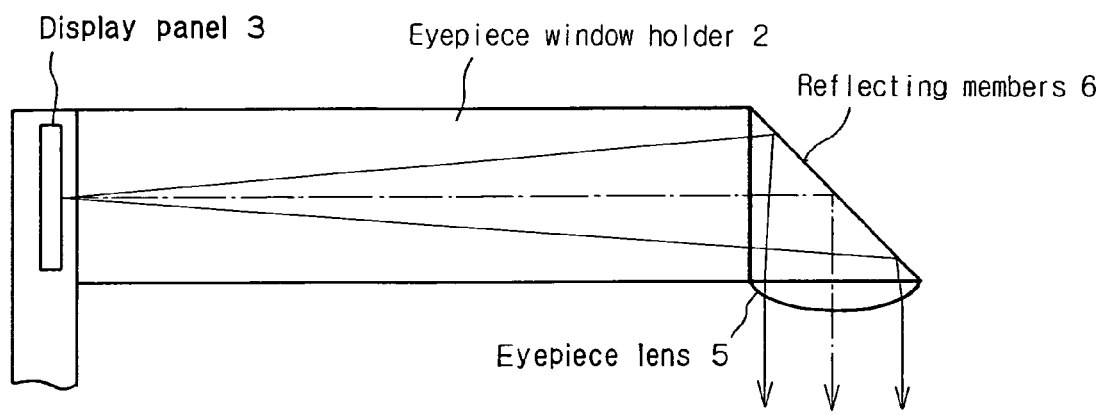
FIG. 8(a) is illustrative of its basic arrangement.
Figure 8B:
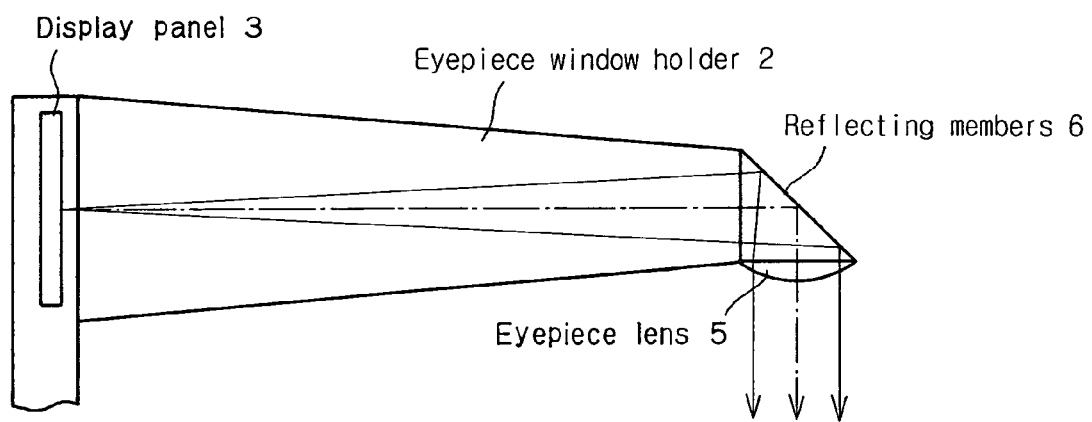
FIG. 8(b) is illustrative of the member to form the eyepiece window holder, which is configured as a tapered structure.
Figure 10A:
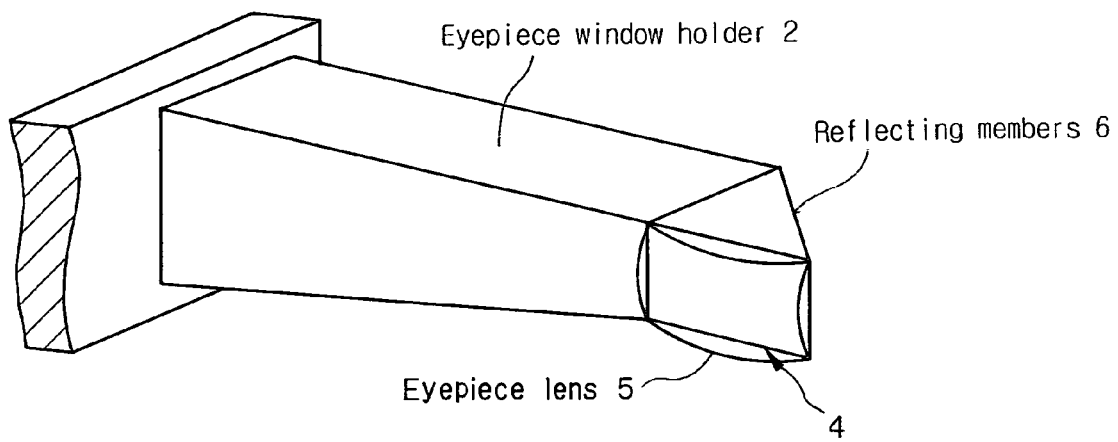
FIG. 10(a) is a perspective view of the exemplary arrangement of FIG. 8.
Figure 10B:
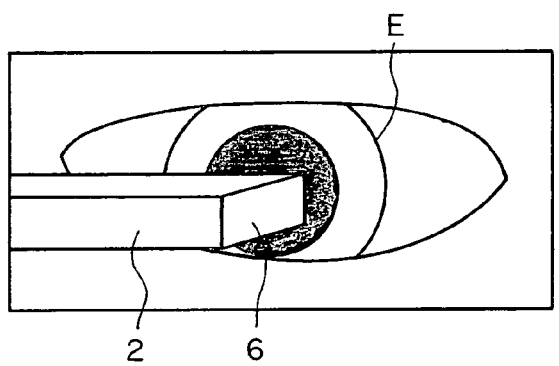
FIG. 10(b) is illustrative of what relation the tip of the eyepiece window holder has to the eyeball at the time of viewing on that exemplary arrangement.
Figure 10C:
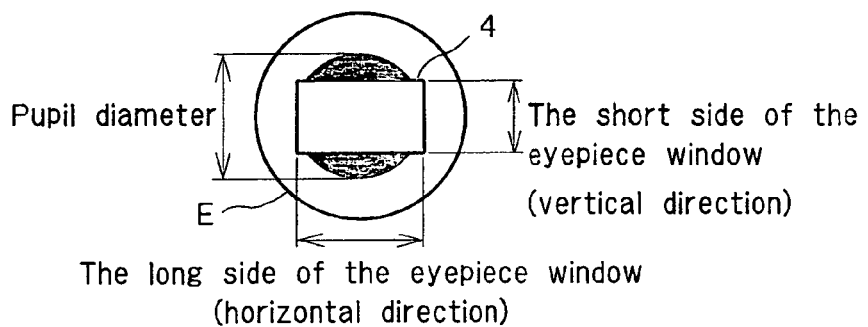
FIG. 10(c) is illustrative of what relation the eyepiece window has then to the pupil diameter size.
Figure 11A:
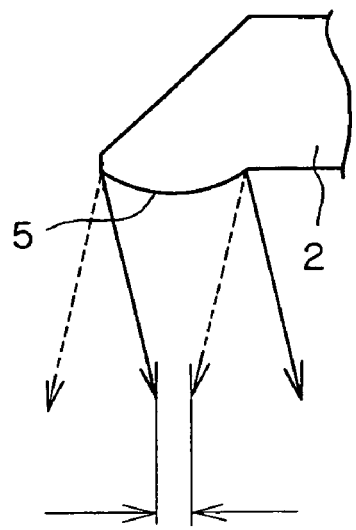
[FIG. 11] is illustrative of the horizontal width of an eye point depending on the horizontal length of the eyepiece window.
Figure 11B:
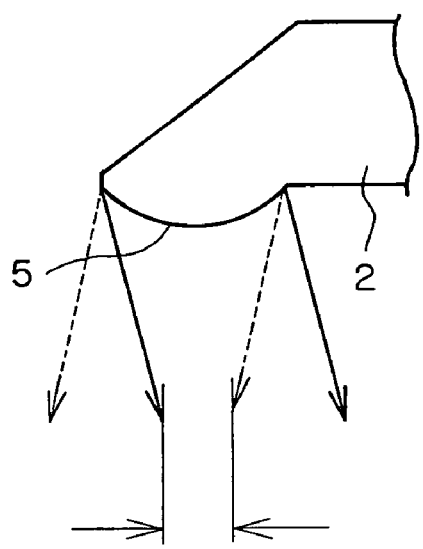
Figure 12:
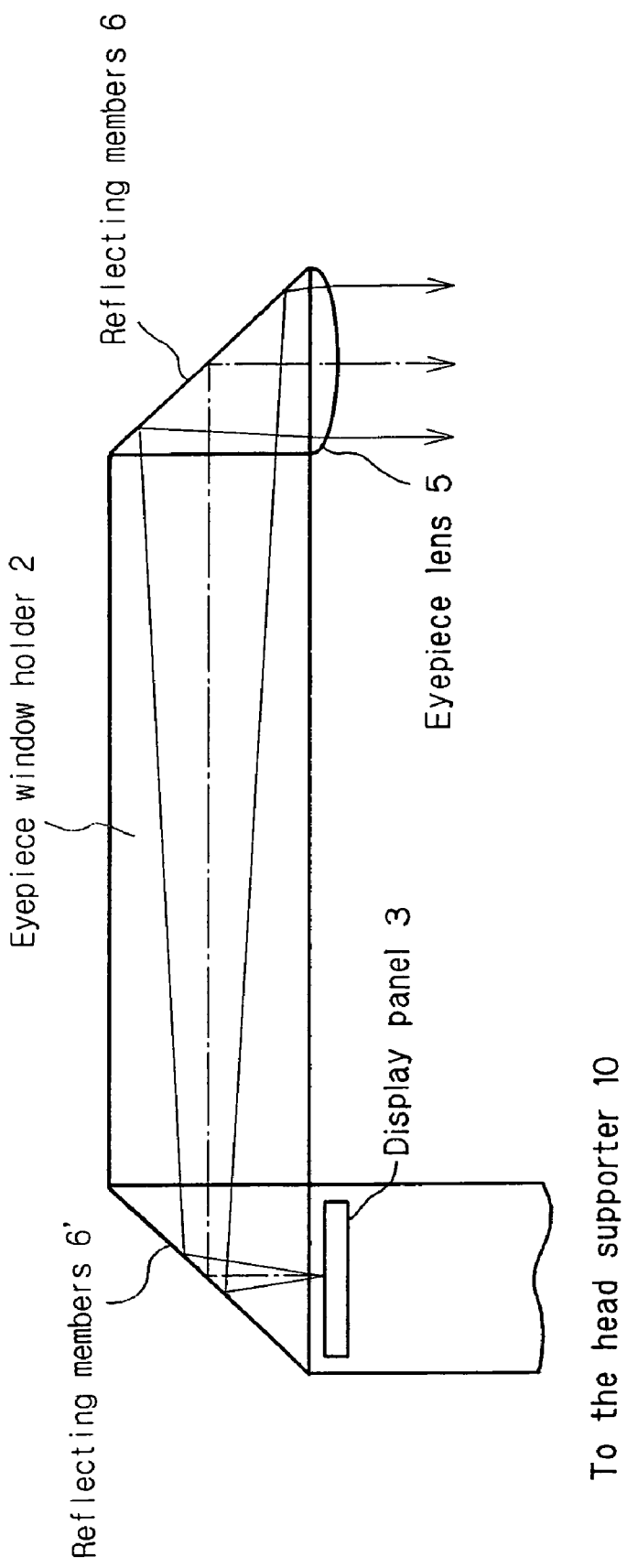
[FIG. 12] is illustrative of an exemplary arrangement wherein two reflecting members are used in the optical path through the eyepiece window holder.
Figure 13A:
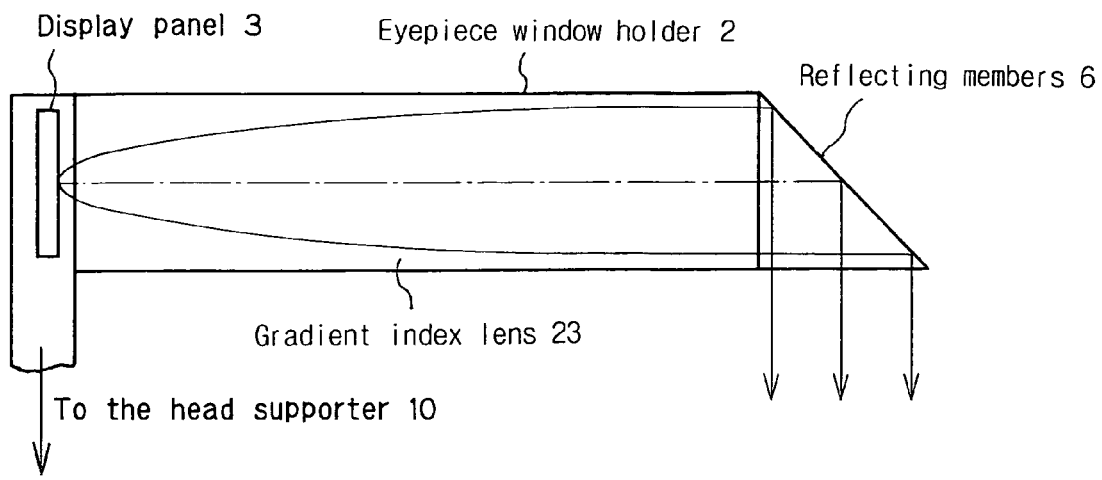
[FIG. 13] is illustrative of an exemplary arrangement wherein a gradient index lens is used for the optical system built in the eyepiece window holder.
Figure 13B:
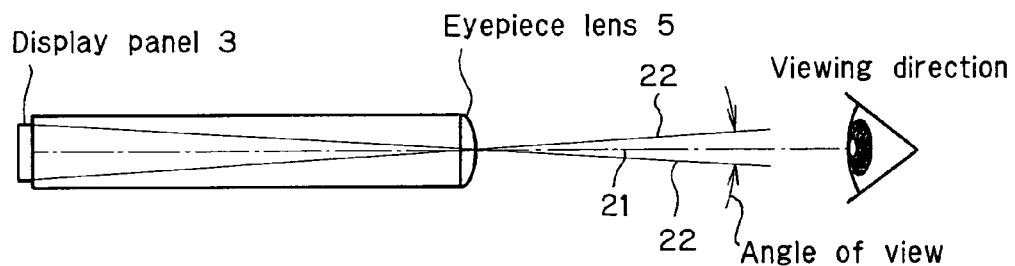
Figure 13C:
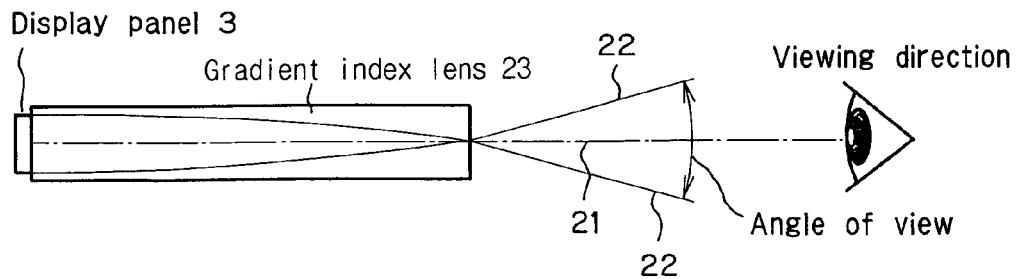
Figure 14:
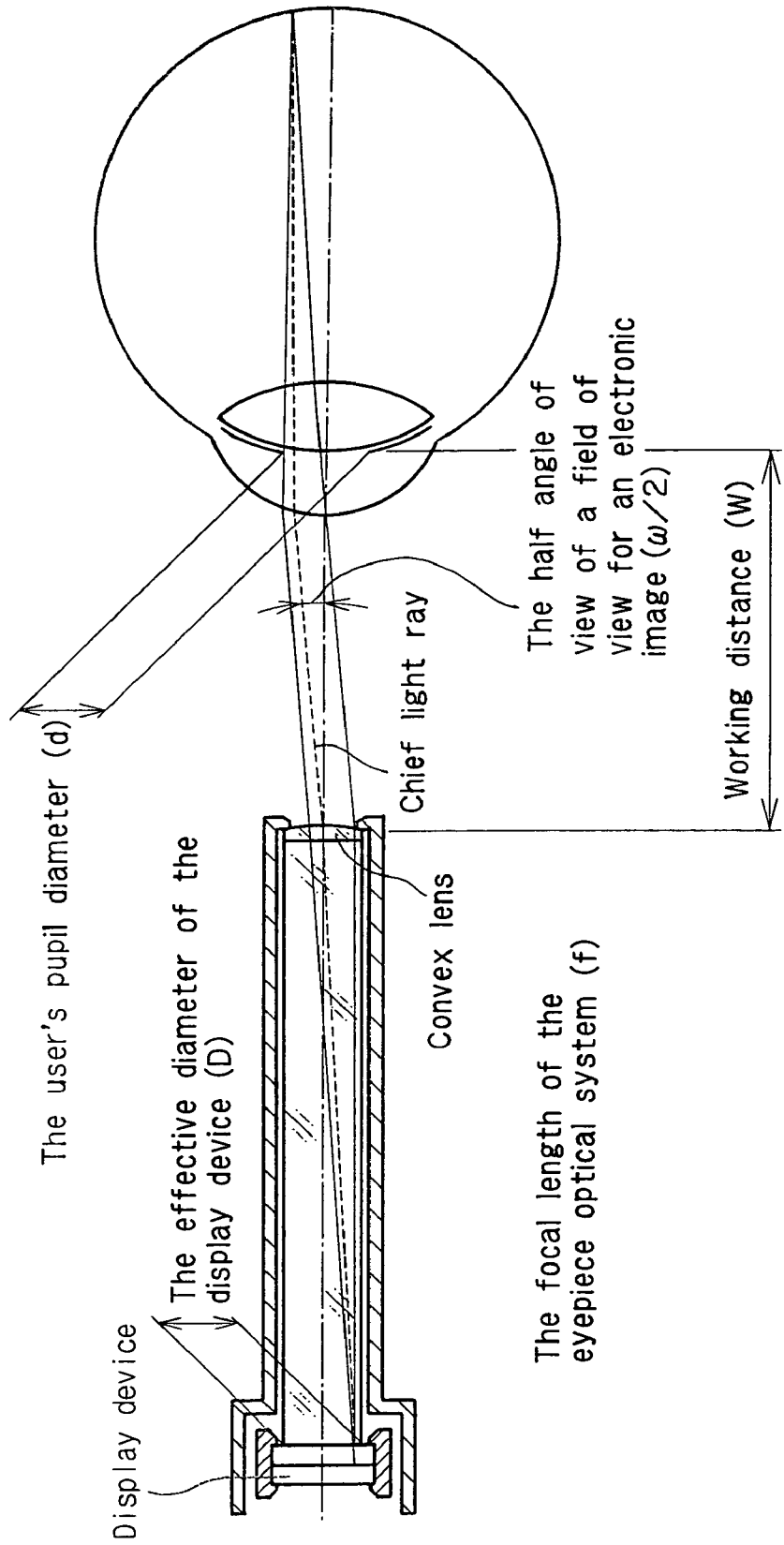
[FIG. 14] is illustrative of relations among various parameters of the optical system in the display system of the invention.
Figure 15:
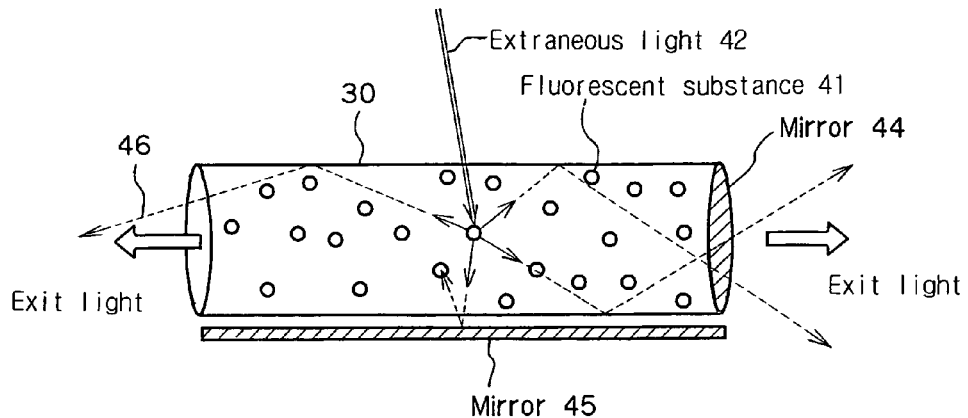
[FIG. 15] is illustrative of a fluorescent resin rod for utilizing extraneous light for back light.
Figure 16A:
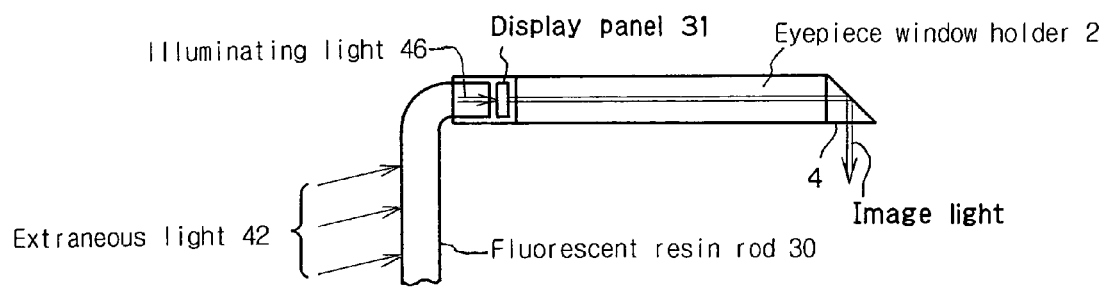
[FIG. 16] is illustrative of an exemplary arrangement of the display system wherein the fluorescent resin rod is used.
Figure 16B:
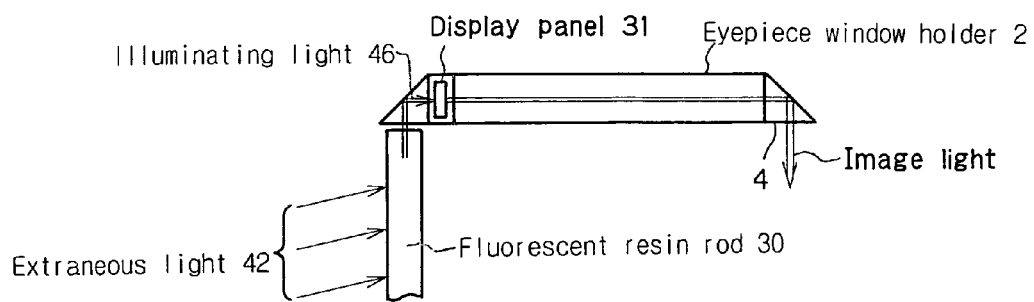
Figure 17A:
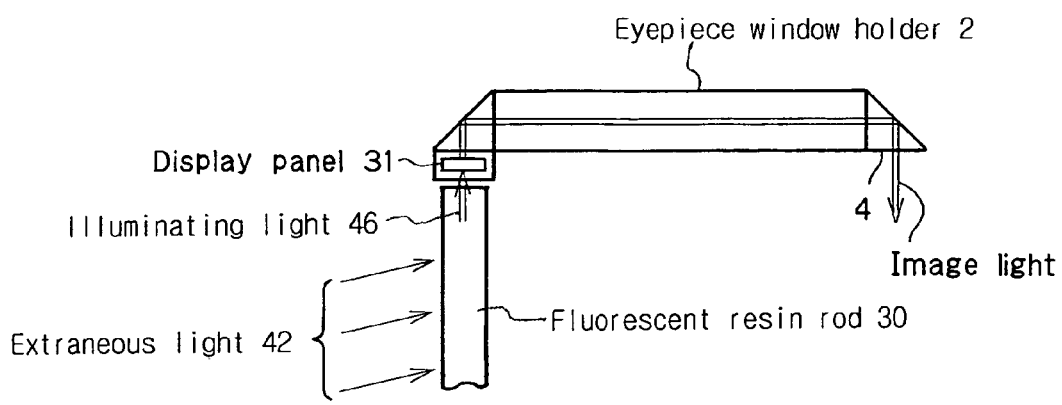
[FIG. 17] is illustrative of an exemplary arrangement of the display system wherein the fluorescent resin rod is used.
Figure 17B:
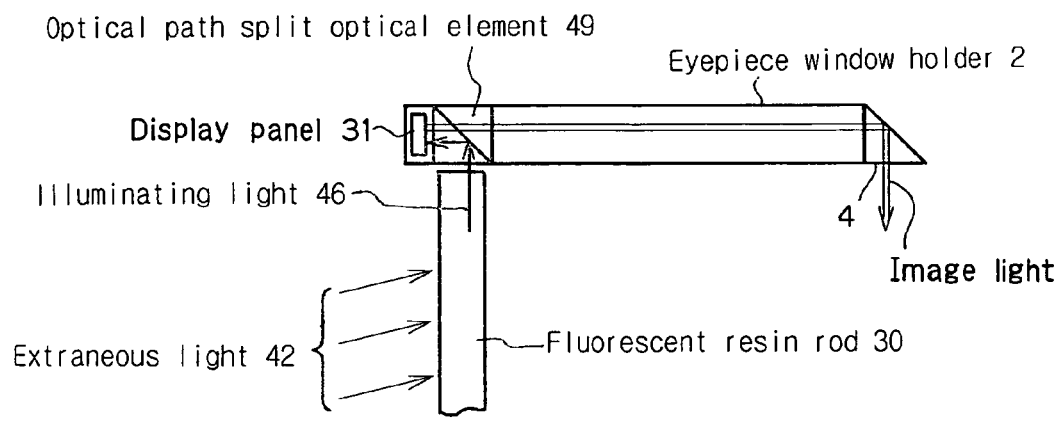
Figure 18A:
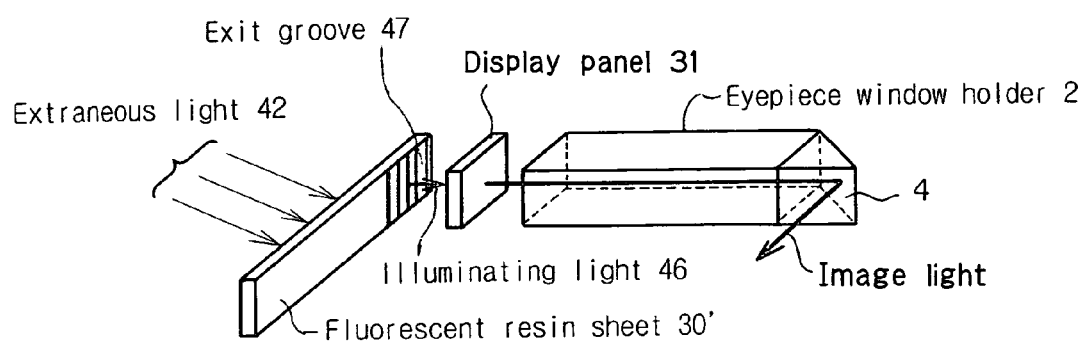
[FIG. 18] is illustrative of an exemplary arrangement wherein a fluorescent resin rod and a light guidance sheet are combined together into a display panel's back light.
Figure 18B:
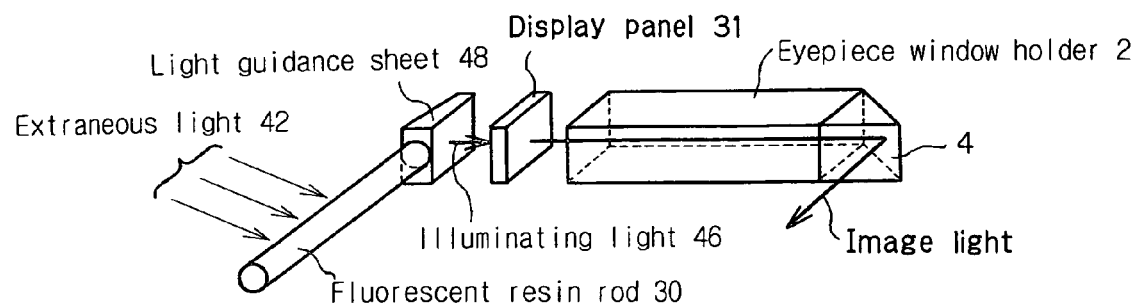
Figure 19:
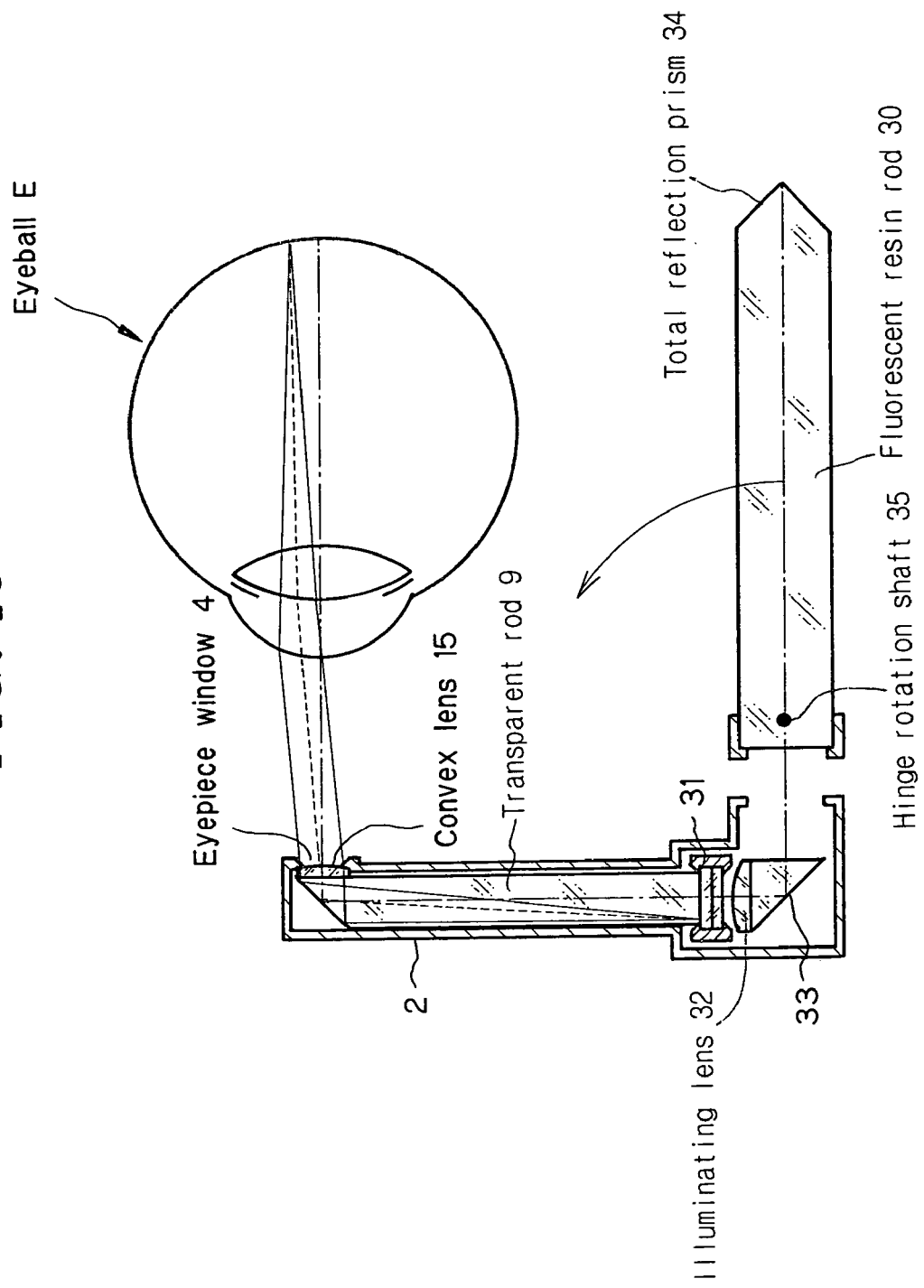
[FIG. 19] is illustrative of another exemplary arrangement wherein the fluorescent resin rod is used.
Figure 20:
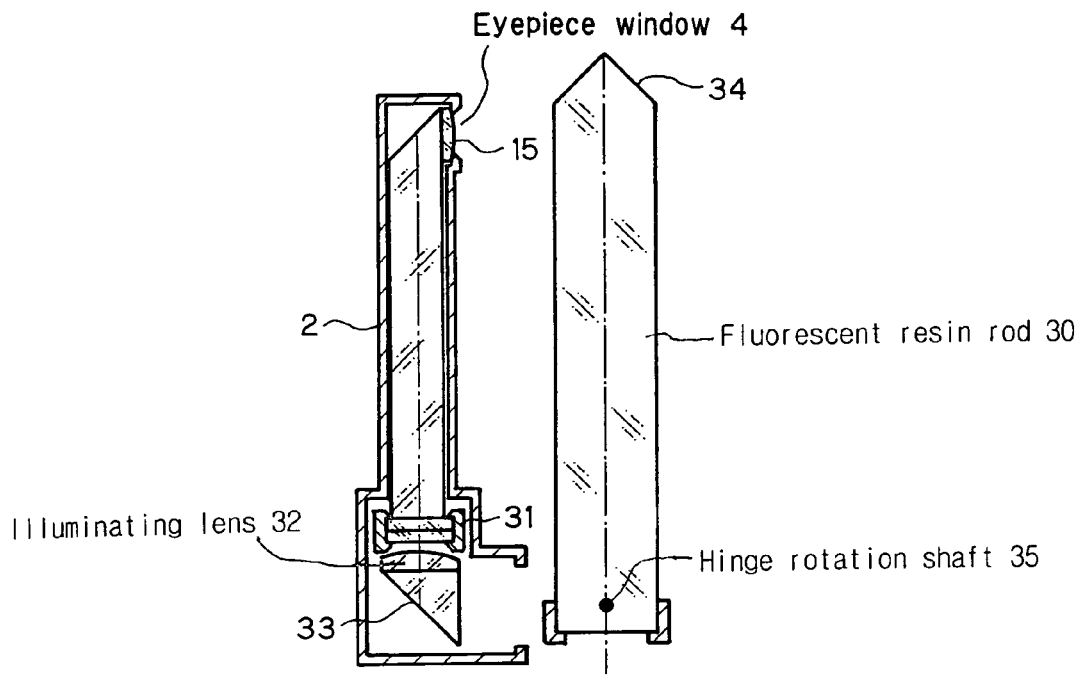
[FIG. 20] is illustrative of the arrangement of FIG. 19 in a folded-down state.
Figure 21:
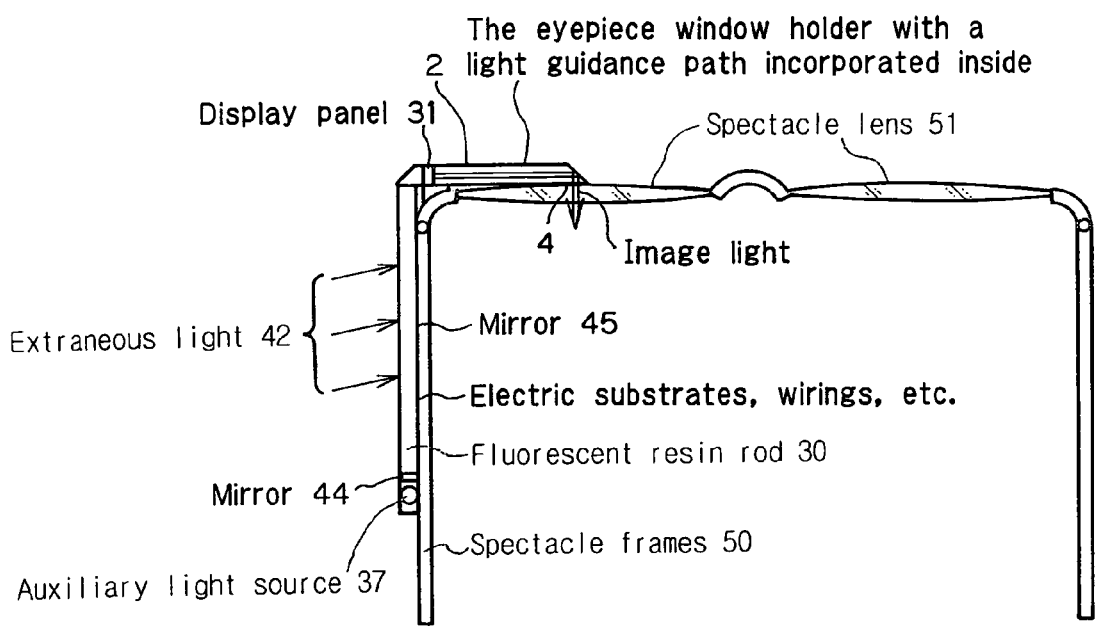
[FIG. 21] is illustrative of an example wherein the head mount type image display system of the invention is attached to a pair of spectacles.
Figure 22:
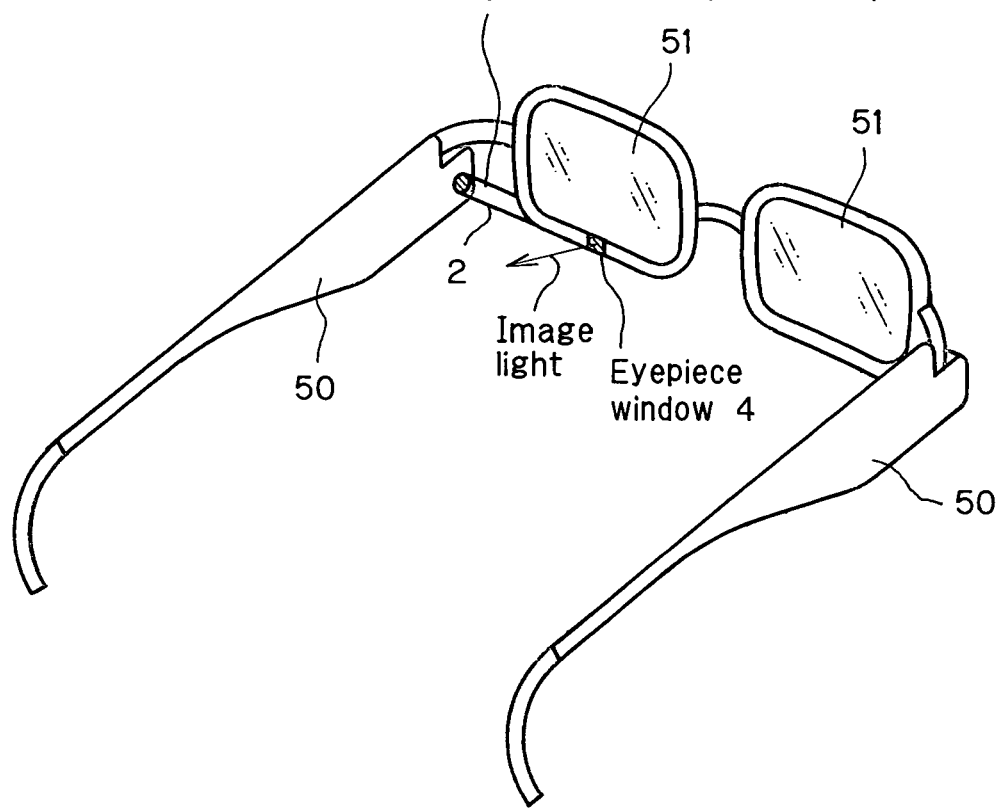
[FIG. 22] is illustrative of an example wherein the head mount type image display system of the invention is incorporated in spectacle frames.
Figure 23:
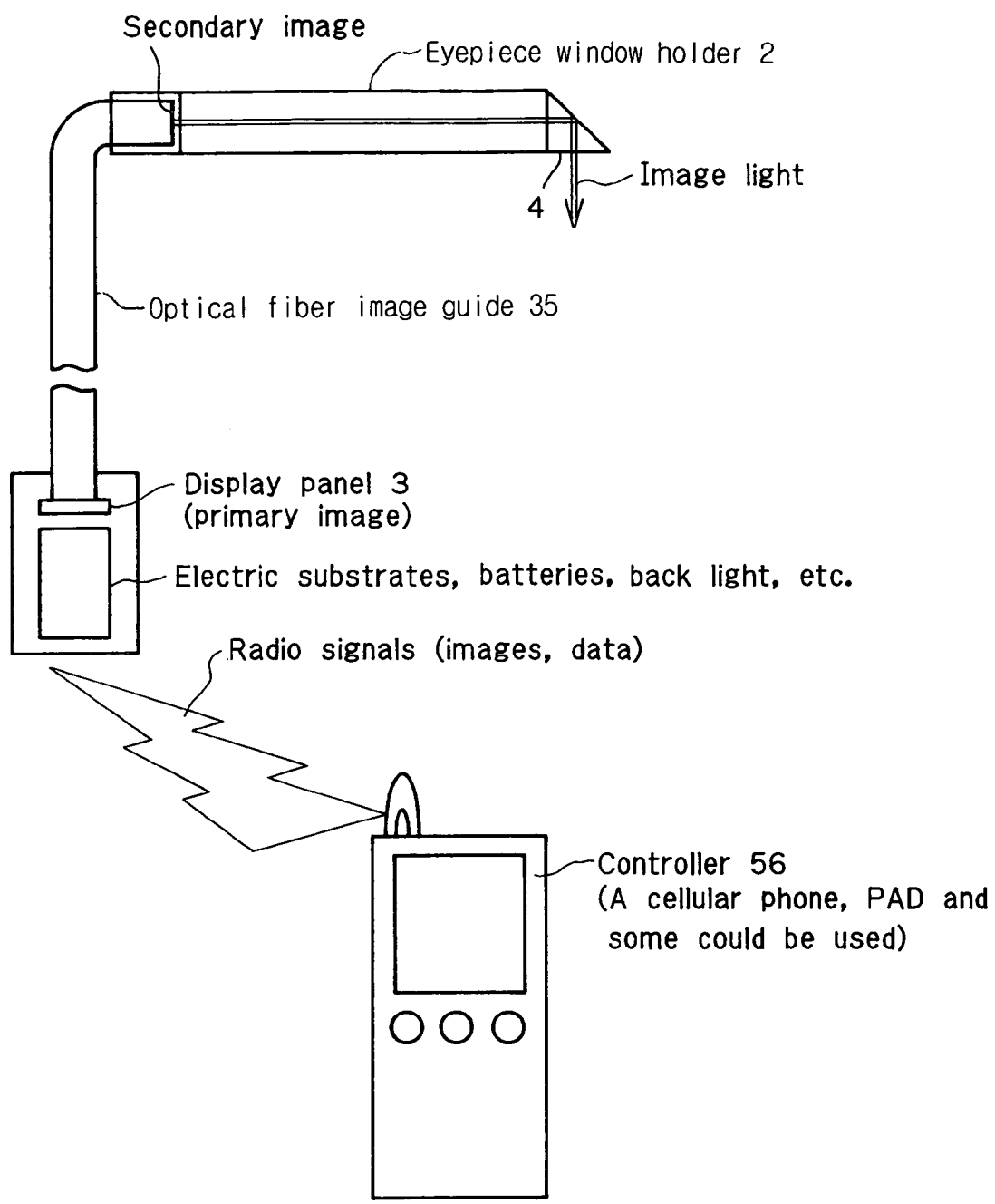
[FIG. 23] is illustrative of an exemplary arrangement that incorporates an optical fiber image guide.
Figure 24:
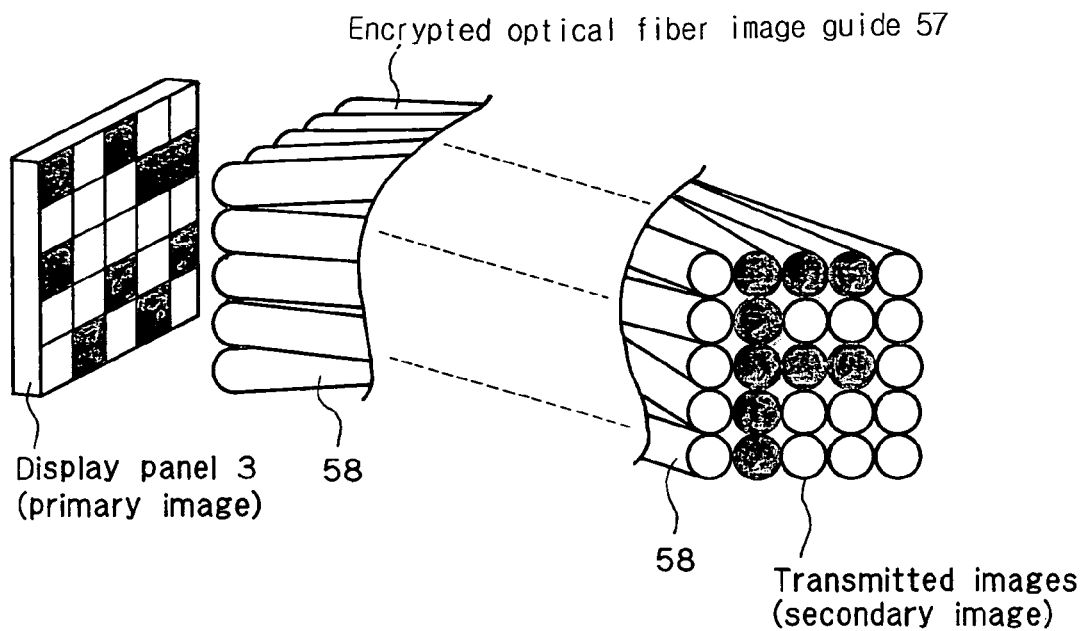
[FIG. 24] is illustrative of the arrangement and operation of an encrypted optical fiber image guide.
Figure 25:
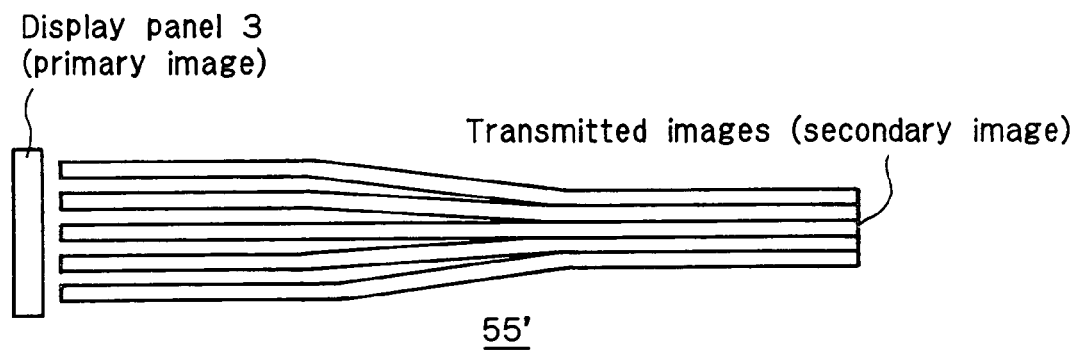
[FIG. 25] is illustrative of an image compression optical fiber image guide.
Figure 26:
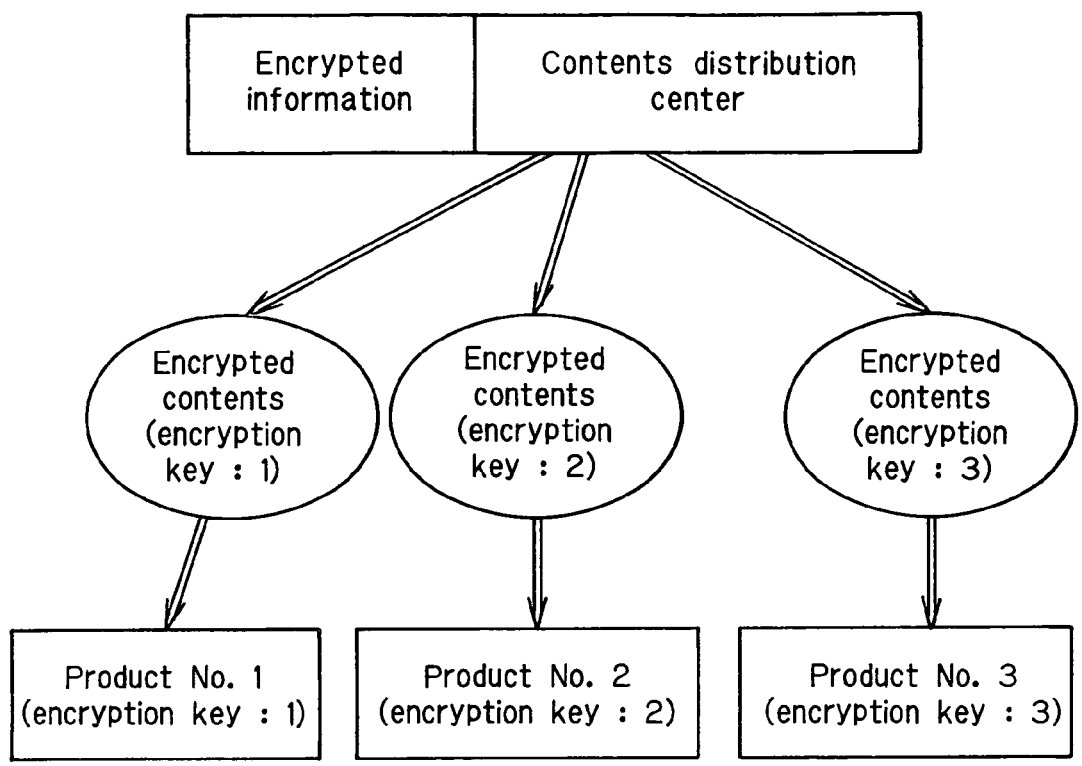
[FIG. 26] is illustrative in schematic of contents distribution for a system in which such an encrypted optical fiber image guide as shown in FIG. 24 is used.
Figure 27:
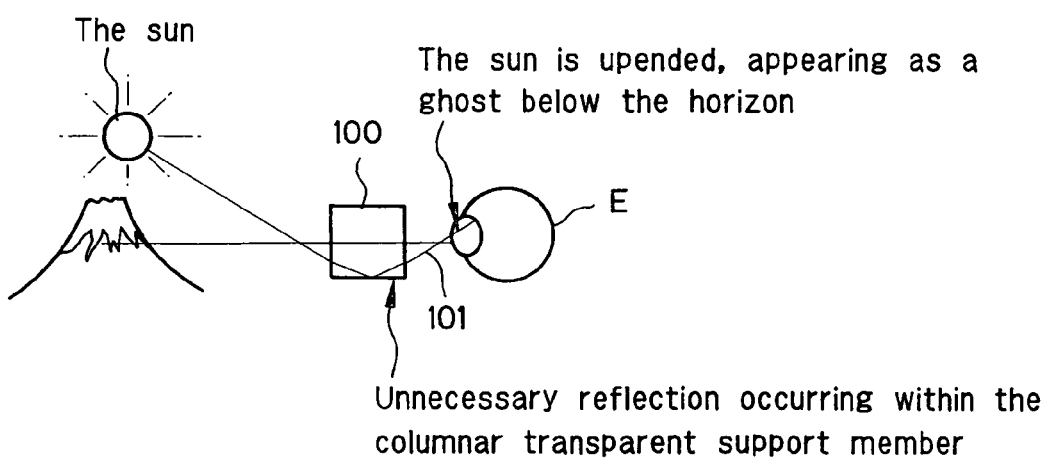
[FIG. 27] is illustrative of problems with the prior art.

| | |
|---|---|
| M: | the human head |
| E: | the eyeball |
| 1: | head mount type display (image display system) |
| 2: | eyepiece window holder |
| $2_1$: | casing having the same diameter all across (eyepiece window holder) |
| $2_2$: | casing having a tapered structure (eyepiece window holder) |
| 3: | display panel |
| 3': | aerial image |
| 4: | eyepiece window |
| 5: | eyepiece optical system (eyepiece lens) |
| 6, 6': | reflecting members |
| 9: | transparent rod |
| 10: | head supporter |
| 11: | image exit portion |
| 15: | convex lens |
| 21: | optical axis |
| 22: | light rays from the end of the display panel |
| 23: | gradient index lens |
| 30: | fluorescent resin rod |
| 30': | fluorescent resin sheet |
| 31: | transmission type display panel (transmission type liquid crystal device) |
| 32: | illuminating lens |
| 33: | reflecting prism |
| 34: | total reflection prism (corner cube) |
| 35: | hinge rotation shaft |
| 36: | reflection type display panel |
| 37: | auxiliary light source |
| 41: | fluorescent substance |
| 43: | internally emitted light |
| 44, 45: | mirrors |
| 46: | illuminating light |
| 49: | optical path split optical element |
| 47: | exit groove |
| 48: | light guidance sheet |
| 50: | spectacle frames |
| 51: | spectacle lens |
| 55: | optical fiber image guide |
| 55': | image compression optical fiber image guide |
| 56: | controller |
| 57: | encrypted optical fiber image guide |
| 58: | optical fibers |
| 100: | columnar transparent support member |
| 101: | unnecessary light |

We claim:

1. A head mount image display system comprising:
a display device;
an eyepiece optical system which forms a virtual image of an image displayed on the display device, and which includes a reflection member which shifts an optical axis in the eyepiece optical system to direct the light to a user's eye, wherein the reflection member comprises one of a total reflection mirror and a total reflection prism;
an eyepiece window through which the light for forming the virtual image is directed to the user's eye from the reflection member;
an eyepiece window holder which holds the eyepiece window within a field of view of the user's eye; and
a supporter which is adapted to be fitted onto the user's head and which supports the eyepiece window holder, the eyepiece optical system, and the display device;
wherein the eyepiece window has a width of not more than 4 mm that is smaller than a pupil's diameter projected in a visual axis direction of the user's eye, when the supporter is fitted onto the user's head and the eyepiece window is positioned within a field of view of the user's eye;
wherein an exit pupil is positioned at least one of: (i) in a vicinity of the eyepiece window, and (ii) between the eyepiece window and a pupil of the user's eye; and
wherein the eyepiece window does not completely block substantially parallel light from outside the head mount image display system from entering the pupil of the user's eye.

2. The system as claimed in claim 1, wherein the eyepiece window holder is held by the supporter to extend substantially horizontally when the supporter is fitted onto the user's head.

3. The system as claimed in claim 1, further comprising a rotation mechanism via which the reflection member and the eyepiece window as a whole are rotatable about an axis which is parallel to a longitudinal direction of the eyepiece window holder.

4. The system as claimed in claim 1, further comprising a rotation mechanism via which the display device is rotatable about an axis which is perpendicular to a display surface of the display device.

5. The system as claimed in claim 1, wherein at least a part of the eyepiece optical system is integral with the eyepiece window.

6. The system as claimed in claim 1, wherein at least a part of the eyepiece optical system is built in the eyepiece window holder.

7. The system as claimed in claim 6, wherein said at least a part of the eyepiece optical system which is built in the eyepiece window holder comprises an optical system which converges parallel light.

8. The system as claimed in claim 7, wherein the eyepiece optical system comprises a convex lens.

9. The system as claimed in claim 6, wherein the eyepiece optical system comprises an optical medium having a refractive index which increases gradually outward radially from a center of the medium.

10. The system as claimed in claim 1, wherein the eyepiece window has a rectangular shape with long sides that extend in the same direction as a longitudinal direction of the eyepiece window holder.

11. The system as claimed in claim 1, the eyepiece window has an aperture size that is not more than a pupil's diameter in a vertical direction, and which is greater than a pupil's diameter in a horizontal direction.

12. The system as claimed in claim 1, the eyepiece window has an aperture size that is not more than 4 mm in a vertical direction, and which is greater than 4 mm in a horizontal direction.

13. The system as claimed in claim 1, further comprising one of a total reflection mirror, a total reflection prism, and an optical fiber image guide, positioned between the display device and the eyepiece window holder to guide light from the display device to the eyepiece optical system.

14. The system as claimed in claim 1, further comprising an illumination portion; and
one of a total reflection mirror, a total reflection prism, a light guide sheet, and a light guide, positioned between the illumination portion and the display device, to guide light from the illumination portion to the display device.

15. The system as claimed in claim 1, wherein D/f<0.5 is satisfied, where D is a diagonal dimension of an effective display surface of the display device, and f is a focal length of the eyepiece optical system.

16. The system as claimed in claim 1, wherein light from the display device does not pass through the eyepiece window holder.

17. The system as claimed in claim 1, further comprising an illuminating light source for illuminating the display device, wherein the illuminating light source comprises a fluorescent resin rod.

18. The system as claimed in claim 17, wherein an end face of the fluorescent resin rod at an opposite end of the fluorescent resin rod from the display device is one of coated with a mirror and formed in a corner cube shape.

19. The system as claimed in claim 17, further comprising a mirror located on a side of said fluorescent resin rod on which no external light is incident.

20. The system as claimed in claim 1, wherein the eyepiece window is positioned with respect to the user's eye such that the visual axis of the user's eye does not overlap the eyepiece window, and such that a chief light ray through the eyepiece window is incident within a pupil diameter of the user's eye.

21. The system as claimed in claim 1, wherein the eyepiece window holder has a tapered structure which tapers toward the eyepiece window.

22. The system as claimed in claim 1, wherein the image viewed via the eyepiece window is a secondary image formed by transmission through an optical fiber image guide of an image displayed by the display device.

23. The system as claimed in claim 22, wherein the optical fiber image guide comprises an encrypted optical fiber image guide having irregularly arranged optical fibers; and
wherein the image displayed by the display device is an image which is decrypted by the encrypted optical fiber image guide to be displayed as the secondary image.

24. The system as claimed in claim 22, wherein a pixel pitch of the optical fiber image guide on an entrance side thereof is different from a pixel pitch of the optical fiber image guide on an exit side thereof such that the secondary image is smaller in size than the image displayed by the display device.

25. The system as claimed in claim 1, wherein a display portion including the display device, the eyepiece window holder, the eyepiece optical system and the eyepiece window are built in a spectacle frame.

26. The system as claimed in claim 1, wherein a condition $D/f < d/W$ is satisfied, where D is a diagonal dimension of an effective display surface of the display device, f is a focal length of the eyepiece optical system, d is the pupil diameter of the user, and W is a working distance.

27. The system as claimed in claim 1, wherein the eyepiece window has a width size of 4 mm or less and a length size of 4 mm or more orthogonal to the width size.

28. The system as claimed in claim 1, herein, in a range of the eyepiece window holder extending at least 10 mm from the eyepiece window, the eyepiece holder has a width of not more than 4 mm that is smaller than the pupil's diameter projected in the visual axis direction of the user's eye, when the supporter is fitted onto the user's head and the eyepiece window is positioned within the field of view of the user's eye.

* * * * *